US012746735B2

(12) United States Patent
Moody, III

(10) Patent No.: US 12,746,735 B2
(45) Date of Patent: Sep. 29, 2026

(54) LOFTY NONWOVEN FABRICS

(71) Applicant: Berry Global, Inc., Evansville, IN (US)

(72) Inventor: Ralph A. Moody, III, Mooresville, NC (US)

(73) Assignee: MAGNERA CORPORATION, Charlotte, NC (US)

( * ) Notice: Subject to any disclaimer, the term of this patent is extended or adjusted under 35 U.S.C. 154(b) by 441 days.

(21) Appl. No.: 16/267,780

(22) Filed: Feb. 5, 2019

(65) Prior Publication Data

US 2019/0240955 A1 Aug. 8, 2019

Related U.S. Application Data

(60) Provisional application No. 62/626,242, filed on Feb. 5, 2018.

(51) Int. Cl.
*B32B 5/26* (2006.01)
*B32B 5/02* (2006.01)
(Continued)

(52) U.S. Cl.
CPC ................ *B32B 5/26* (2013.01); *B32B 5/022* (2013.01); *B32B 5/028* (2013.01); *B32B 5/08* (2013.01);
(Continued)

(58) Field of Classification Search
CPC ............ B32B 2262/02; B32B 2262/14; B32B 2262/0253; B32B 2262/0261; B32B 2262/0269; B32B 2262/0276; B32B 2262/0284; B32B 2262/0892; B32B 7/022; B32B 2307/50; B32B 2307/718; B32B 2307/72; B32B 5/08; B32B 5/022;
(Continued)

(56) References Cited

U.S. PATENT DOCUMENTS 4,188,436 A * 2/1980 Ellis ........................ B32B 27/34 428/198
4,761,322 A * 8/1988 Raley ........................ B32B 7/04 428/198
(Continued)

FOREIGN PATENT DOCUMENTS

CA 2158790 A1 * 3/1996
EP 0490476 A1 6/1992
(Continued)

OTHER PUBLICATIONS

Celanese Acetate, Complete Textile Glossary, pp. 17 and 35, 2001 (Year: 2001).*

(Continued)

*Primary Examiner* — Braelyn R Watson
(74) *Attorney, Agent, or Firm* — BURR & FORMAN

(57) ABSTRACT

Nonwoven fabrics are provided that include (i) at least one disposable-high-loft nonwoven layer having a plurality of crimped multi-component fibers and (ii) a scrim. A first side of the scrim may be bonded directly or indirectly to a first disposable-high-loft nonwoven layer and optionally a second side of the scrim may be bonded directly or indirectly to a second disposable-high-loft nonwoven layer. The first disposable-high-loft nonwoven layer has a first density and the scrim has a scrim density, in which the scrim density is larger than the first density.

22 Claims, 12 Drawing Sheets

(51) Int. Cl.

| | |
|---|---|
| ***B32B 5/08*** | (2006.01) |
| ***B32B 7/022*** | (2019.01) |
| ***B32B 7/05*** | (2019.01) |
| ***D04H 1/541*** | (2012.01) |
| ***D04H 3/147*** | (2012.01) |
| ***D04H 3/16*** | (2006.01) |

(52) U.S. Cl.

CPC ................ *B32B 7/022* (2019.01); *B32B 7/05* (2019.01); *D04H 1/5412* (2020.05); *D04H 1/5414* (2020.05); *D04H 3/147* (2013.01); *D04H 3/16* (2013.01); *B32B 2262/02* (2013.01); *B32B 2262/12* (2013.01); *B32B 2307/50* (2013.01); *B32B 2307/718* (2013.01); *D04H 1/5416* (2020.05)

(58) Field of Classification Search

CPC .. B32B 5/26; B32B 5/028; B32B 7/05; B32B 5/273; B32B 7/14; B32B 37/065; B32B 38/06; B32B 2250/02; B32B 5/275; B32B 5/267; B32B 5/269; D04H 1/541; D04H 3/16; D04H 1/54–5405

USPC ..... 442/35, 36, 57, 381, 382, 383, 384, 352, 442/32, 50, 401; 428/352, 371

See application file for complete search history.

(56) References Cited

U.S. PATENT DOCUMENTS

| | | | | | |
|---|---|---|---|---|---|
| 5,382,400 | A * | 1/1995 | Pike | D04H 3/14 | 264/168 |
| 5,470,640 | A * | 11/1995 | Modrak | D04H 1/74 | 428/218 |
| 5,622,772 | A | 4/1997 | Stokes et al. | | |
| 5,780,155 | A * | 7/1998 | Ishizawa | D04H 1/43832 | 428/374 |
| 6,454,989 | B1 | 9/2002 | Neely et al. | | |
| 6,735,833 | B2 | 5/2004 | Putnam et al. | | |
| 7,762,800 | B2 | 7/2010 | Geus et al. | | |
| 2003/0171728 | A1* | 9/2003 | Heyn | A61F 13/534 | 604/378 |
| 2004/0077247 | A1* | 4/2004 | Schmidt | E04B 1/88 | 442/361 |
| 2004/0097155 | A1* | 5/2004 | Olson | D04H 3/16 | 442/352 |
| 2005/0197027 | A1* | 9/2005 | Crane | B32B 5/26 | 442/389 |
| 2010/0105273 | A1* | 4/2010 | Motomura | D04H 3/005 | 442/329 |
| 2013/0253461 | A1* | 9/2013 | Xu | A61F 13/511 | 428/156 |
| 2015/0342789 | A1* | 12/2015 | Caputi | A61F 13/539 | 156/62.2 |
| 2016/0167334 | A1* | 6/2016 | Arora | A61F 13/5116 | 428/137 |
| 2019/0350774 | A1* | 11/2019 | Rönnberg | A61F 13/51394 | |

FOREIGN PATENT DOCUMENTS

| | | | | |
|---|---|---|---|---|
| EP | 3246443 A1 * | 11/2017 | D02G 3/04 |
| EP | 3246443 B1 * | 6/2020 | A61F 13/51478 |
| WO | 2002018693 A2 | 3/2002 | |
| WO | 2004013395 A1 | 2/2004 | |
| WO | 2004038116 A1 | 5/2004 | |

OTHER PUBLICATIONS

Bartels, V. T. (2011). Handbook of Medical Textiles—4.1 Introduction. Woodhead Publishing (Year: 2011).*

Chapman, R. A. (2010). Applications of Nonwovens in Technical Textiles—5.2.3.2 Cotton Core Nonwovens (CCNs). Woodhead Publishing (Year: 2010).*

Celanese Acetate, Textile Glossary, p. 61 (Year: 2001).*

Midha, Vinay Kumar, and A. Dakuri. "Spun bonding technology and fabric properties: a review." J. Text. Eng. Fash. Technol 1.4 (2017): 1-9. (Year: 2017).*

Second Written Opinion of the International Preliminary Examining Authority for PCT/US2019/016607 mailed Jan. 7, 2020, all enclosed pages cited.

International Search Report and Written Opinion of PCT/US2019/016607 mailed Apr. 17, 2019, all enclosed pages cited.

Third Written Opinion of the International Preliminary Examining Authority for international application No. PCT/US2019/016607 mailed Mar. 24, 2020, all enclosed pages cited.

International Preliminary Report on Patentability for international application No. PCT/US2019/016607 mailed May 11, 2020, all enclosed pages cited.

Office Action (with English translation) issued in corresponding Colombian Application No. NC2020/0009042 on Jun. 6, 2022, all enclosed pages cited.

* cited by examiner

LOFTY NONWOVEN FABRICS

CROSS-REFERENCE TO RELATED APPLICATIONS

This application claims priority under 35 U.S.C. § 119(e) to U.S. Provisional Application No. 62/626,242, filed Feb. 5, 2018, which is expressly incorporated by reference herein in its entirety.

TECHNICAL FIELD

Embodiments of the presently-disclosed invention relate generally to disposable-high-loft nonwoven fabrics having improved resistance to deformation, such as elongation in a machine direction and/or width reduction in a cross-direction due to an external load or tension applied along the machine direction on the nonwoven fabric. Embodiments of the presently-disclosed invention also generally relate to methods of making such disposable-high-loft nonwoven fabrics and the use of such disposable-high-loft nonwoven fabrics as a component in a hygiene-related article (e.g., diaper).

BACKGROUND

In nonwoven fabrics, the fibers forming the nonwoven fabric are generally oriented in the x-y plane of the web. As such, the resulting nonwoven fabric is relatively thin and lacking in loft or significant thickness in the z-direction. Loft or thickness in a nonwoven fabric suitable for use in hygiene-related articles (e.g., personal care absorbent articles) promotes comfort (softness) to the user, surge management, and fluid distribution to adjacent components of the article. In this regard, high loft, low density nonwoven fabrics are used for a variety of end-use applications, such as in hygiene-related products (e.g., sanitary pads and napkins, disposable diapers, incontinent-care pads, etc.). High loft and low density nonwoven fabrics, for instance, may be used in products such as towels, industrial wipers, incontinence products, infant care products (e.g., diapers), absorbent feminine care products, and professional health care articles.

In order to impart loft or thickness to a nonwoven fabric, it is generally desirable that at least a portion of the fibers comprising the web be oriented in the z-direction. Conventionally, such lofty nonwoven webs are produced using crimped staple fibers or post-forming processes such as creping or pleating of the formed fabric. Although methods exist for producing high loft and low density fabrics, the fabrics are typically subjected to a number of processes during conversion which compress and/or deform the material. Compression of the fabric may reduce the overall bulk that was created while conveyance of the fabric in a machine direction during a variety of converting processes may induce undesirable elongation in the machine direction and/or necking (e.g., reduction in width in the cross-direction) that negatively impact the ability of the converting process due to the overall deformation of the fabric.

Therefore, there remains a need in the art for lofty nonwoven fabrics having improved resistance to deformation, such as elongation in a machine direction and/or width reduction in a cross-direction due to an external load or tension applied along the machine direction on the nonwoven fabric. There also remains a need in the art for methods of making such lofty nonwoven fabrics.

SUMMARY OF INVENTION

One or more embodiments of the invention may address one or more of the aforementioned problems. Certain embodiments according to the invention provide nonwoven fabrics that include (i) at least one disposable-high-loft ("DHL") nonwoven layer having a plurality of crimped multi-component fibers (e.g., discontinuous fibers, continuous fibers, or a combination thereof) and (ii) a scrim (e.g., a nonwoven). In accordance with certain embodiments of the invention, the scrim comprises a first side and a second side, in which the first side of the scrim may be directly or indirectly bonded to a first DHL nonwoven layer and optionally the second side of the scrim may be directly or indirectly bonded to a second DHL nonwoven layer such that the scrim is directly or indirectly sandwiched between the first DHL nonwoven layer and the second DHL nonwoven layer. In accordance with certain embodiments of the invention, the first DHL nonwoven layer has a first density, the second DHL nonwoven layer has a second density, and the scrim has a scrim density, in which the scrim density is larger than the first density and/or the second density. In accordance with certain embodiments of the invention, the at least one DHL nonwoven layer (e.g., the first DHL nonwoven layer) comprises a percent elongation in a machine direction at 5 N/5 cm that is greater than a percent elongation in the machine direction of the scrim. In this regard, the lower percent elongation corresponding to the scrim may beneficially impart a reduced percent elongation of the nonwoven fabric while not negatively impacting the loftiness of the at least one DHL nonwoven layer.

In another aspect, the present invention provides a method of forming a nonwoven fabric comprising forming or providing a first DHL nonwoven layer comprising a first plurality of crimped multi-component fibers (e.g., discontinuous fibers, continuous fibers, or a combination thereof), in which the first DHL nonwoven layer has a first density and a first percent elongation in a machine direction at 5 N/5 cm. The method may further comprise forming or providing a scrim (e.g., a nonwoven) including a first side and a second side, in which the scrim has a scrim density that is larger than the first density and scrim percent elongation in the machine direction at 5 N/5 cm that is less than the first percent elongation. In accordance with certain embodiments of the invention, the method may comprise directly or indirectly bonding the first side of the scrim to the first DHL nonwoven layer and optionally directly or indirectly bonding the second side of the scrim to the second DHL nonwoven layer to provide a nonwoven fabric as described herein. In accordance with certain embodiments of the invention, the method may comprise melt-spinning a precursor scrim and consolidating the precursor scrim, such as by mechanical bonding (e.g., needle-punching or hydroentanglement), thermal bonding (e.g., through-air-bonding, thermal calendering, or ultrasonic bonding), or adhesive bonding, to form the scrim. Additionally or alternatively, the method may comprise melt-spinning a precursor first DHL nonwoven layer directly or indirectly onto the scrim and consolidating the precursor DHL nonwoven layer to form the DHL nonwoven layer and in certain embodiments to simultaneously bond the first side of the scrim to the first DHL nonwoven layer. The consolidation of the of the precursor DHL nonwoven layer may be carried out by a variety of means including, for example, thermal bonding (e.g., through-air-bonding, thermal calendering, or ultrasonic bonding).

In another aspect, the present invention provides a hygiene-related article (e.g., diaper), in which one or more of the components of the hygiene-related article comprises a nonwoven fabric as described and disclosed herein.

BRIEF DESCRIPTION OF THE DRAWING(S)

The invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout, and wherein:

FIG. 2A-2H illustrate examples of cross-sectional views for some example multi-component fibers in accordance with certain embodiments of the invention, while

DETAILED DESCRIPTION

Figure 1A:
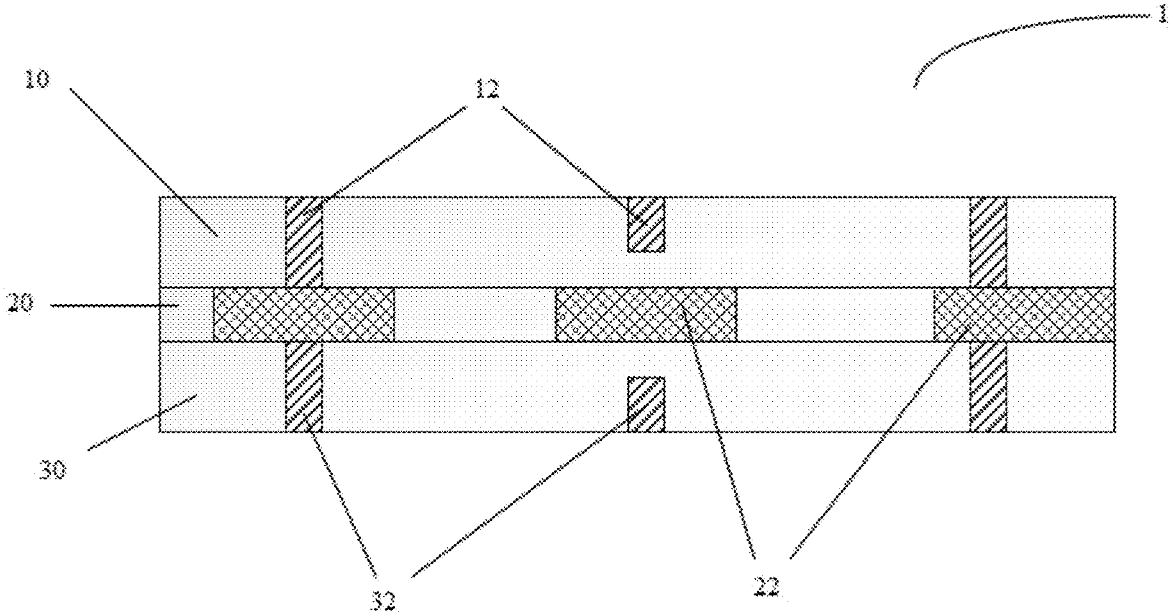
FIG. 1A illustrates a cross-sectional view of a nonwoven fabric in accordance with certain embodiments of the invention.

The invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. As used in the specification, and in the appended claims, the singular forms "a", "an", "the", include plural referents unless the context clearly dictates otherwise.

The presently-disclosed invention relates generally to disposable-high-loft ("DHL") nonwoven fabrics having improved resistance to deformation, such as elongation in a machine direction and/or width reduction in a cross-direction due to an external load or tension applied along the machine direction on the nonwoven fabric. In accordance with certain embodiments of the invention, the nonwoven fabrics may comprise the loftiness or bulk of a traditional high-loft nonwoven on one or both sides of the nonwoven while simultaneously providing improved resistance to deformation, such as elongation in a machine direction and/or width reduction in a cross-direction due to an external load or tension applied along the machine direction on the nonwoven fabric. For example, nonwoven fabrics in accordance with certain embodiments of the invention may comprise a scrim directly or indirectly bonded to one or more DHL nonwoven layers, in which the scrim, at least in part, imparts structural integrity to the nonwoven fabric that mitigates undesirable deformation in the x-y dimensions (e.g., machine direction and/or cross-direction) while the one or more DHL nonwoven layers provides loftiness or bulk in the z-direction associated with, for example, traditional high-loft nonwoven fabrics.

The terms "substantial" or "substantially" may encompass the whole amount as specified, according to certain embodiments of the invention, or largely but not the whole amount specified (e.g., 95%, 96%, 97%, 98%, or 99% of the whole amount specified) according to other embodiments of the invention.

The terms "polymer" or "polymeric", as used interchangeably herein, may comprise homopolymers, copolymers, such as, for example, block, graft, random, and alternating copolymers, terpolymers, etc., and blends and modifications thereof. Furthermore, unless otherwise specifically limited, the term "polymer" or "polymeric" shall include all possible structural isomers; stereoisomers including, without limitation, geometric isomers, optical isomers or enantionmers; and/or any chiral molecular configuration of such polymer or polymeric material. These configurations include, but are not limited to, isotactic, syndiotactic, and atactic configurations of such polymer or polymeric material. The term "polymer" or "polymeric" shall also include polymers made from various catalyst systems including, without limitation, the Ziegler-Natta catalyst system and the metallocene/single-site catalyst system. The term "polymer" or "polymeric" shall also include, in according to certain embodiments of the invention, polymers produced by fermentation process or biosourced.

The term "cellulosic fiber", as used herein, may comprise fibers derived from hardwood trees, softwood trees, or a combination of hardwood and softwood trees prepared for use in, for example, a papermaking furnish and/or fluff pulp furnish by any known suitable digestion, refining, and bleaching operations. The cellulosic fibers may comprise recycled fibers and/or virgin fibers. Recycled fibers differ from virgin fibers in that the fibers have gone through the drying process at least once. In certain embodiments, at least a portion of the cellulosic fibers may be provided from non-woody herbaceous plants including, but not limited to, kenaf, cotton, hemp, jute, flax, sisal, or abaca. Cellulosic fibers may, in certain embodiments of the invention, comprise either bleached or unbleached pulp fiber such as high yield pulps and/or mechanical pulps such as thermo-mechanical pulping (TMP), chemical-mechanical pulp (CMP), and bleached chemical-thermo-mechanical pulp BCTMP. In this regard, the term "pulp", as used herein, may comprise cellulose that has been subjected to processing treatments, such as thermal, chemical, and/or mechanical treatments. Cellulosic fibers, according to certain embodiments of the invention, may comprise one or more pulp materials.

The terms "nonwoven" and "nonwoven web", as used herein, may comprise a web having a structure of individual fibers, filaments, and/or threads that are interlaid but not in an identifiable repeating manner as in a knitted or woven fabric. Nonwoven fabrics or webs, according to certain embodiments of the invention, may be formed by any process conventionally known in the art such as, for example, meltblowing processes, spunbonding processes, needle-punching, hydroentangling, air-laid, and bonded carded web processes.

The term "staple fiber", as used herein, may comprise a cut fiber from a filament. In accordance with certain embodiments, any type of filament material may be used to form staple fibers. For example, staple fibers may be formed from polymeric fibers, and/or elastomeric fibers. Non-limiting examples of materials may comprise polyolefins (e.g., a polypropylene or polypropylene-containing copolymer), polyethylene terephthalate, and polyamides. The average length of staple fibers may comprise, by way of example only, from about 2 centimeter to about 15 centimeter.

The term "layer", as used herein, may comprise a generally recognizable combination of similar material types and/or functions existing in the X-Y plane.

The term "multi-component fibers", as used herein, may comprise fibers formed from at least two different polymeric materials or compositions (e.g., two or more) extruded from separate extruders but spun together to form one fiber. The term "bi-component fibers", as used herein, may comprise fibers formed from two different polymeric materials or compositions extruded from separate extruders but spun together to form one fiber. The polymeric materials or polymers are arranged in a substantially constant position in distinct zones across the cross-section of the multi-component fibers and extend continuously along the length of the multi-component fibers. The configuration of such a multi-component fibers may be, for example, a sheath/core arrangement wherein one polymer is surrounded by another, an eccentric sheath/core arrangement, a side-by-side arrangement, a pie arrangement, or an "islands-in-the-sea" arrangement, each as is known in the art of multicomponent, including bicomponent, fibers.

The term "machine direction" or "MD", as used herein, comprises the direction in which the fabric produced or conveyed. The term "cross-direction" or "CD", as used herein, comprises the direction of the fabric substantially perpendicular to the MD.

The term "crimp" or "crimped", as used herein, comprises a three-dimensional curl or bend such as, for example, a folded or compressed portion having an "L" configuration, a wave portion having a "zig-zag" configuration, or a curl portion such as a helical configuration. In accordance with certain embodiments of the invention, the term "crimp" or "crimped" does not include random two-dimensional waves or undulations in a fiber, such as those associated with normal lay-down of fibers in a melt-spinning process.

The term "disposable-high-loft" and "DHL", as used herein, comprises a material that comprises a z-direction thickness generally in excess of about 0.2 mm and a relatively low bulk density. The thickness of a "disposable-high-loft" nonwoven and/or layer may be greater than 0.2 mm (e.g., greater than 0.3 mm, greater than 0.4 mm, greater than 0.5 mm, or greater than 1 mm) as determined utilizing a ProGage Thickness tester (model 89-2009) available from Thwig-Albert Instrument Co. (West Berlin, N.J. 08091), which utilizes a 2" diameter foot, having a force application of 1.45 kPa during measurement. In accordance with certain embodiments of the invention, the thickness of a "disposable-high-loft" nonwoven and/or layer may be at most about any of the following: 3, 2.75, 2.5, 2.25, 2, 1.75, 1.5, 1.25, 1.0, 0.75, and 0.5 mm and/or at least about any of the following: 0.2, 0.3, 0.4, 0.5, 0.75, 1.0, 1.25, 1.5, 1.75, and 2.0 mm. "Disposable-high-loft" nonwovens and/or layers, as used herein, may additionally have a relatively low density (e.g., bulk density—weight per unit volume), such as less than about 60 kg/m$^3$, such as at most about any of the following: 70, 60, 55, 50, 45, 40, 35, 30, and 25 kg/m$^3$ and/or at least about any of the following: 10, 15, 20, 25, 30, 35, 40, 45, 50, and 55 kg/m$^3$.

All whole number end points disclosed herein that can create a smaller range within a given range disclosed herein are within the scope of certain embodiments of the invention. By way of example, a disclosure of from about 10 to about 15 includes the disclosure of intermediate ranges, for example, of: from about 10 to about 11; from about 10 to about 12; from about 13 to about 15; from about 14 to about 15; etc. Moreover, all single decimal (e.g., numbers reported to the nearest tenth) end points that can create a smaller range within a given range disclosed herein are within the scope of certain embodiments of the invention. By way of example, a disclosure of from about 1.5 to about 2.0 includes the disclosure of intermediate ranges, for example, of: from about 1.5 to about 1.6; from about 1.5 to about 1.7; from about 1.7 to about 1.8; etc.

In one aspect, the invention provides provide nonwoven fabrics that include (i) at least one DHL nonwoven layer having a plurality of crimped multi-component fibers (e.g., discontinuous fibers, continuous fibers, or a combination thereof) and (ii) a scrim (e.g., a nonwoven). In accordance with certain embodiments of the invention, the scrim comprises a first side and a second side, in which the first side of the scrim may be directly or indirectly bonded to a first DHL nonwoven layer and optionally the second side of the scrim may be directly or indirectly bonded to a second DHL nonwoven layer such that the scrim is directly or indirectly sandwiched between the first DHL nonwoven layer and the second DHL nonwoven layer. In accordance with certain embodiments of the invention, the first DHL nonwoven layer has a first density, the second DHL nonwoven layer has a second density, and the scrim has a scrim density, in which the scrim density is larger than the first density and/or the second density. In accordance with certain embodiments of the invention, the at least one DHL nonwoven layer (e.g., the first DHL nonwoven layer) comprises a percent elongation in a machine direction at 5 N/5 cm that is greater than a percent elongation in the machine direction of the scrim. In this regard, in accordance with certain embodiments of the invention the lower percent elongation corresponding to the scrim may beneficially impart a reduced percent elongation of the nonwoven fabric while not negatively impacting the loftiness of the at least one DHL nonwoven layer.

Figure 1B:
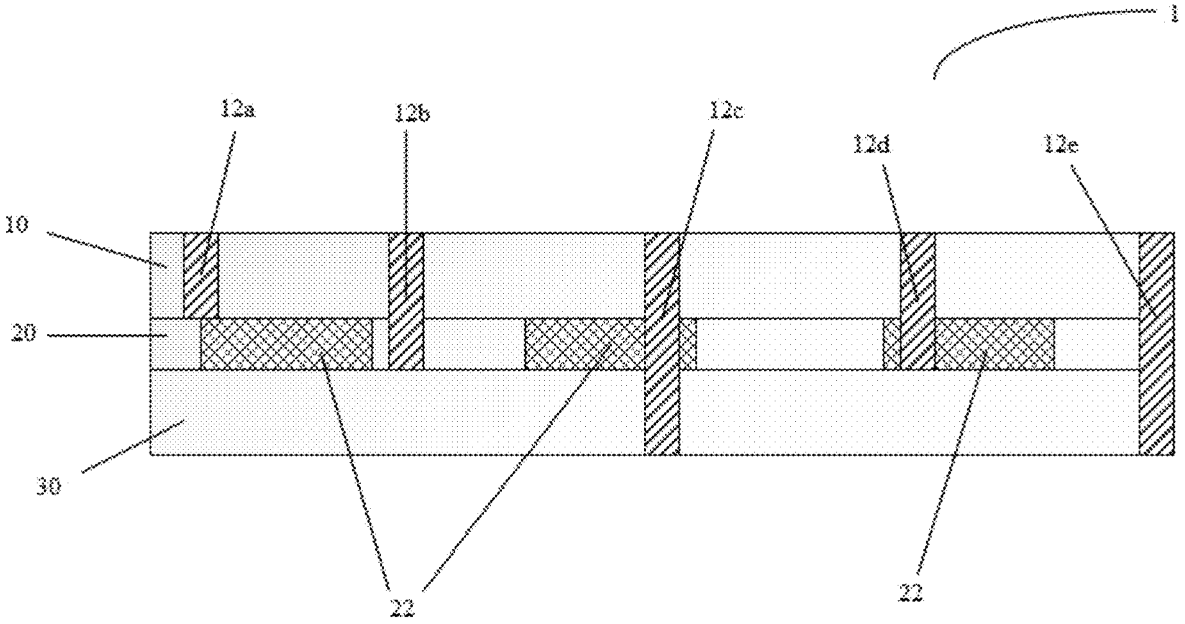
FIG. 1B illustrates a cross-sectional view of a nonwoven fabric in accordance with certain embodiments of the invention.

As illustrated in FIGS. 1A and 1B, a nonwoven fabric 1 in accordance with certain embodiments of the invention may comprise a first DHL nonwoven layer 10 and a scrim 20. FIGS. 1A and 1B illustrates an optional second DHL nonwoven layer 30, in which the scrim 20 is directly bonded to both the first DHL nonwoven layer 10 and the second DHL nonwoven layer 30. As shown in FIGS. 1A and 1B, the first DHL nonwoven layer 10 may comprise a first plurality of discrete first bond sites 12. In this regard, the discrete first bond sites 12 may individually extend in the z-direction (e.g., thickness) of the first DHL nonwoven layer 10 from about 25% to about 100% (e.g., 50% to 100%) through the first DHL nonwoven layer. In this regard, discrete first bond sites 12 that extend completely through the z-direction of the first DHL nonwoven layer 10 may bond the first DHL nonwoven layer to the underlying scrim 20 as shown in FIGS. 1A and 1B. The scrim 20 may comprise discrete scrim bond sites 22. As illustrated in FIGS. 1A and 1B, the discrete scrim bond sites 22 may comprise larger bonded areas in which adjacent discrete scrim bond sites 22 are closer together than the discrete first bond sites 12. FIG. 1A also illustrates embodiments including an optional second DHL nonwoven layer 30 including a plurality of second discrete bond sites 32 similar to those of the first DHL nonwoven layer. FIG. 1B illustrates embodiments in which the first plurality of discrete first bond sites 12 independently extend through varying depths of the nonwoven fabric 1 (e.g., z-direction of the nonwoven fabric). As illustrated by FIG. 1B, bond site 12*a* extends completely through the z-direction of the first DHL nonwoven layer 10 and bonds the first DHL nonwoven layer to the underlying scrim 20. Bond site 12*a*, for instance, partially overlaps and engages an underlying scrim bond site 22. Bond sites 12*b* and 12*d* each extend completely through the z-direction of the first DHL nonwoven layer 10 and completely through the scrim layer 20. While bond site 12*b* does not overlap, engage, or pass-through a scrim bond site 22, bond site 12*d* may pass through or overlap a scrim bond site 22 of the scrim. FIG. 1B illustrates embodiments including an optional second DHL nonwoven layer 30, while bond sites 12*c* and 12*e* extend completely through the z-direction of the first DHL nonwoven layer 10, completely through the scrim layer 20, and completely through the second DHL nonwoven layer 30. In this regard, FIG. 1B illustrates that the discrete first bond sites 12*a*, 12*b*, 12*c*, 12*d*, 12*e* may randomly intersect with scrim bond sites 22. Such embodiments, for instance, may provide an overall bulk and loftiness on both sides of the nonwoven fabric while the scrim being sandwiched between the outer DHL nonwoven layers imparts structural integrity to the nonwoven fabric in the x-y dimensions.

In accordance with certain embodiments of the invention, the first plurality of crimped multi-component fibers may comprise staple fiber, continuous fibers, or a combination thereof. For example, the first plurality of crimped multi-component fibers may comprise continuous fibers, such as bi-component spunbond fibers. In accordance with certain embodiments of the invention, the first plurality of crimped multi-component fibers may comprise a round cross-section, a non-round cross-section, or a combination thereof. For instance, the first plurality of crimped multi-component fibers in accordance with certain embodiments of the invention may comprise from about 25% to about 100% of round cross-sectional fibers, such as at most about any of the following: 100, 95, 90, 85, 75, and 5 % and/or at least about any of the following: 10, 20, 25, 35, 50, and 75%. Additionally or alternatively, the first plurality of crimped multi-component fibers may comprise from about 25% to about 100% of non-round cross-sectional fibers, such as at most about any of the following: 100, 95, 90, 85, 75, and 50% and/or at least about any of the following: 10, 20, 25, 35, 50, and 75%. In accordance with embodiments of the invention including non-round cross-sectional crimped multi-component fibers, these non-round cross-sectional fibers may comprise an aspect ratio of greater than 1.5:1, such as at most about any of the following: 10:1, 9:1, 8:1, 7:1, 6:1, 5:1, 4:1, 3:1, and 2:1 and/or at least about any of the following: 1.5:1, 2:1, 2.5:1, 3:1, 4:1, 5:1, and 6:1.

In accordance with certain embodiments of the invention, the first plurality of crimped multi-component fibers may comprise a sheath/core configuration, a side-by-side configuration, a pie configuration, an islands-in-the-sea configuration, a multi-lobed configuration, or any combinations thereof In accordance with certain embodiments of the invention, the sheath/core configuration may comprises an eccentric sheath/core configuration including a sheath components and core component that is not concentrically located within the sheath component. The core component, for example, may define at least a portion of an outer surface of the crimped multi-component fiber having the eccentric sheath/core configuration in accordance with certain embodiments of the invention.

Figure 2A:
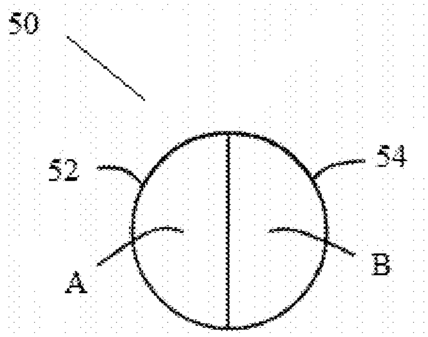
Figure 2B:
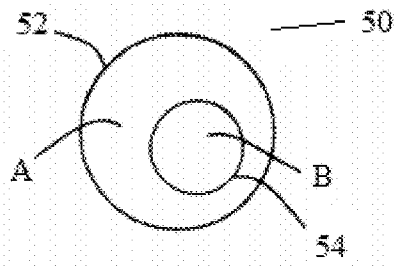
Figure 2C:
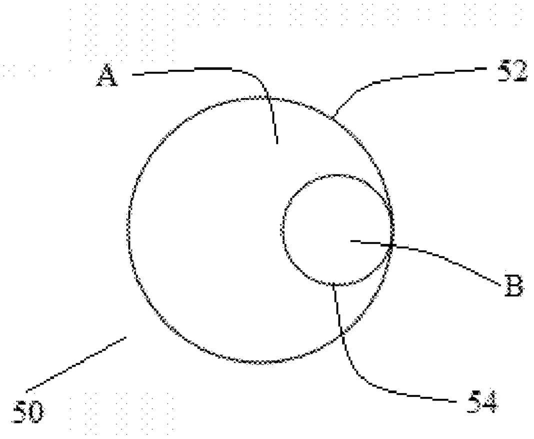
Figure 2D:
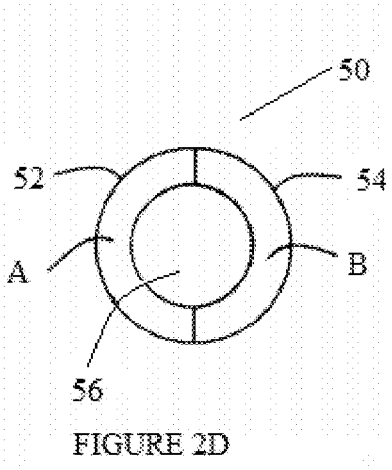
Figure 2E:
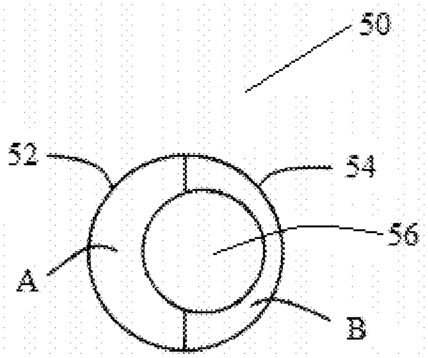
Figure 2F:
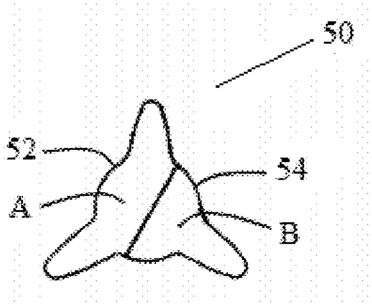
Figure 2G:
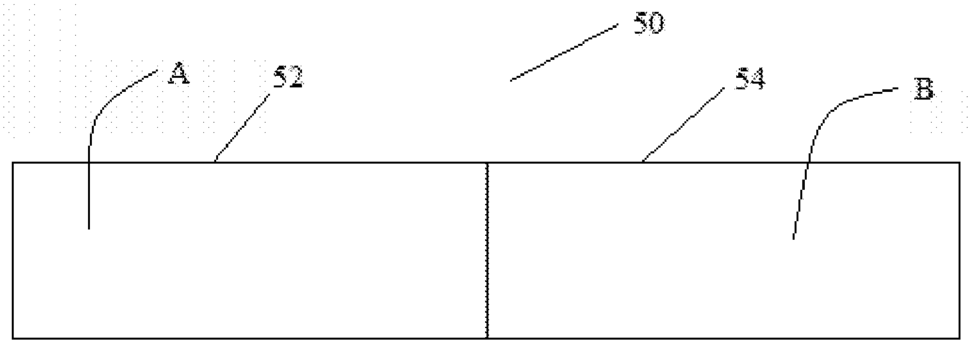
Figure 2H:
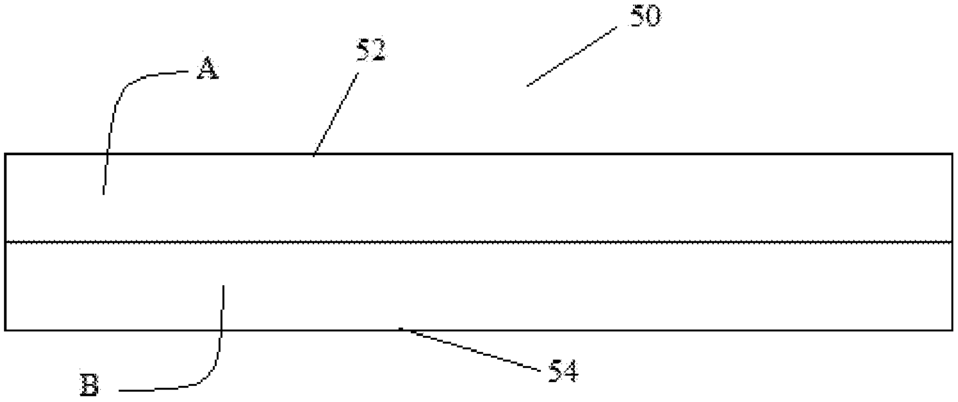
Figure 2I:
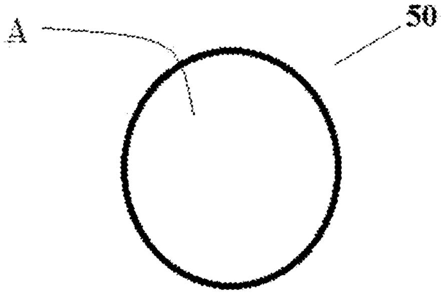
FIG. 2I illustrates a cross-sectional view of a mono-component fiber, which for example may be used in the scrim in accordance with certain embodiments of the invention.
Figure 3:
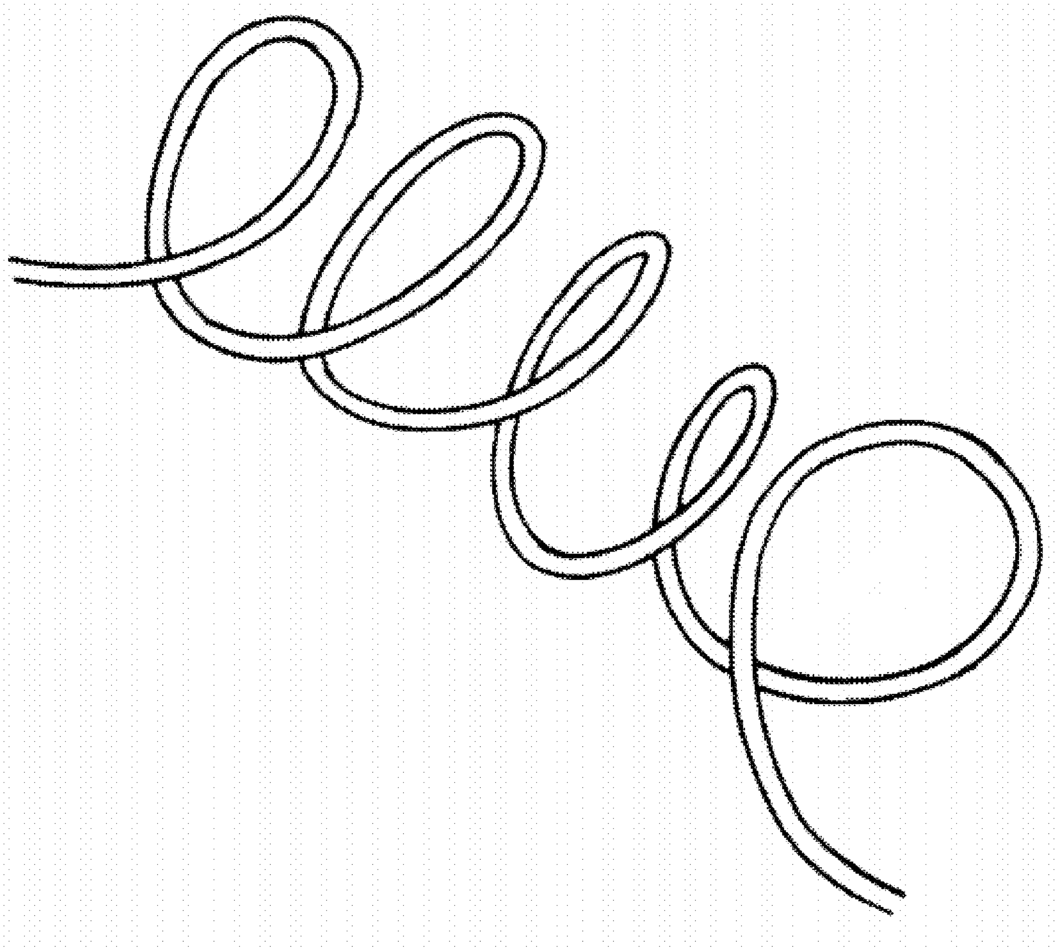
FIG. 3 illustrates a helically crimped multi-component continuous fiber in accordance with certain embodiments of the invention.
Figure 4:
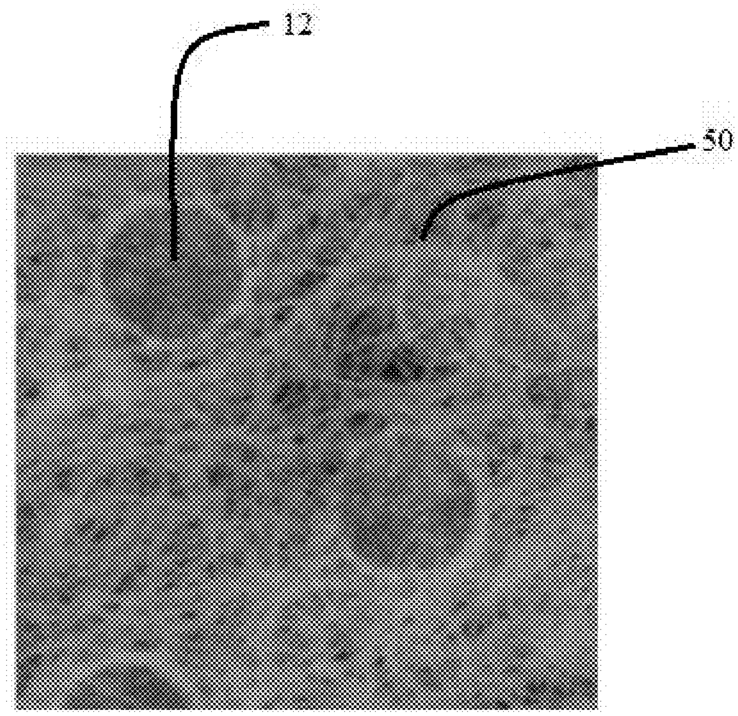
FIG. 4 is an image of a disposable-high-loft nonwoven fabric showing crimped portions of multi-component continuous fibers located between adjacent bond sites.

FIGS. 2A-2H illustrate examples of cross-sectional views for some non-limiting examples of multi-component fibers in accordance with certain embodiments of the invention. As illustrated in FIG. 2A-2H, the fiber 50 may comprise a first polymeric component 52 of a first polymeric composition A and a second polymeric component 54 of a second polymeric composition B. The first and second components 52 and 54 can be arranged in substantially distinct zones within the cross-section of the fiber that extend substantially continuously along the length of the fiber. The first and second components 52 and 54 can be arranged in a side-by-side arrangement in a round cross-sectional fiber as depicted in FIG. 2A or in a ribbon-shaped (e.g., non-round) cross-sectional fiber as depicted in FIGS. 2G and 2H. Additionally or alternatively, the first and second components 52 and 54 can be arranged in a sheath/core arrangement, such as an eccentric sheath/core arrangement as depicted in FIGS. 2B and 2C. In the eccentric sheath/core fibers as illustrated in FIG. 2B, one component fully occludes or surrounds the other but is asymmetrically located in the fiber to allow fiber crimp (e.g., first component 52 surrounds component 54). Eccentric sheath/core configurations as illustrated by FIG. 2C include the first component 52 (e.g., the sheath component) substantially surrounding the second component 54 (e.g., the core component) but not completely as a portion of the second component may be exposed and form part of the outermost surface of the fiber 50. As additional examples, the fibers can comprise hollow fibers as shown in FIGS. 2D and 2E or as multilobal fibers as shown in FIG. 2F. It should be noted, however, that numerous other cross-sectional configurations and/or fiber shapes may be suitable in accordance with certain embodiments of the invention. In the multi-component fibers, in accordance with certain embodiments of the invention, the respective polymer components can be present in ratios (by volume) of from about 85/15 to about 15/85. Ratios of approximately 50/50 may be desirable in accordance with certain embodiments of the invention; however, the particular ratios employed can vary as desired. FIG. 2I illustrates a monocomponent fiber 50 formed from a single polymeric composition A, which be employed, for example, the scrim. Although FIG. 2I illustrates a round monocomponent fiber, the cross-section of the monocomponent fiber may have any geometric cross-section, such as any of those described herein and throughout.

As noted above, the first plurality of crimped multi-component fibers may comprise a first component comprising a first polymeric composition and a second component comprising a second polymeric composition, in which the first polymeric composition is different than the second polymeric composition. For example, the first polymeric composition may comprise a first polyolefin composition and the second polymeric composition may comprise a second polyolefin composition. In accordance with certain embodiments of the invention, the first polyolefin composition may comprise a first polypropylene and/or a first polyethylene and the second polyolefin composition comprises a second polypropylene and/or a second polyethylene, in which the first polypropylene and/or a first polyethylene has, for example, a lower degree of crystallinity than the second polypropylene and/or a second polyethylene.

In accordance with certain embodiments of the invention, the first polymeric composition and the second polymeric composition can be selected so that the multi-component fibers develop one or more crimps therein without additional application of heat either in the draw unit (e.g., during melt attenuation) and/or post-treatments such as after fiber lay down and web formation. The polymeric compositions, therefore, may comprise polymers that are different from one another in that they have disparate stress or elastic recovery properties, crystallization rates, and/or melt viscosities. In accordance with certain embodiments of the invention, multi-component fibers, for example, can form or have crimped fiber portions having a helically-shaped crimp in a single continuous direction. For example, one polymeric composition may be substantially and continuously located on the inside of the helix formed by the crimped nature of the fiber.

In accordance with certain embodiments of the invention, the first plurality of crimped multi-component fibers may comprise an average free crimp percentage from about 50% to about 300%, such as at most about any of the following: 300, 275, 250, 225, 200, 175, 150, 125, 100, and 75% and/or at least about any of the following: 50, 75, 100, 125, 150, 175, and 200%. The first plurality of crimped multi-component fibers may include a plurality of discrete zig-zag configured crimped portions, a plurality of discrete or continuously helically configured crimped portions, or a combination thereof. The average free crimp percentage may be ascertained by determining the free crimp length of the fibers in question with an Instron 5565 equipped with a 2.5 N load cell. In this regard, free or unstretched fiber bundles may be placed into clamps of the machine. The free crimp length can be measured at the point where the load (e.g., 2.5 N load cell) on the fiber bundle becomes constant. The following parameters are used to determine the free crimp length: (i) Record the Approximate free fibers bundle weight in grams (e.g., xxx g±0.002 grams); (ii) Record the Unstretched bundle length in inches; (iii) Set the Gauge Length (i.e., the distance or gap between the clamps holding the bundle of fibers) of the Inston to 1 inch; and (iv) Set the Crosshead Speed to 2.4 inches/minute. The free crimp length of the fibers in question may then be ascertained by recording the extension length of the fibers at the point where the load becomes constant (i.e., the fibers are fully extended). The average free crimp percentage may be calculated from the free crimp length of the fibers in question and the unstretched fiber bundles length (e.g., the gauge length). For example, a measured free crimp length of 32 mm when using a 1 inch (25.4 mm) gauge length as discussed above would provide an average free crimp percentage of about 126%. The foregoing method to determining the average free crimp percentage may be particularly beneficial when evaluating continuous fibers having helically coiled crimps. For instance, traditional textile fibers are mechanically crimped and can be measured optically but continuous fibers having helically coiled crimped portions cause errors in trying to optically count "crimp" in such fibers.

Figure 1C:
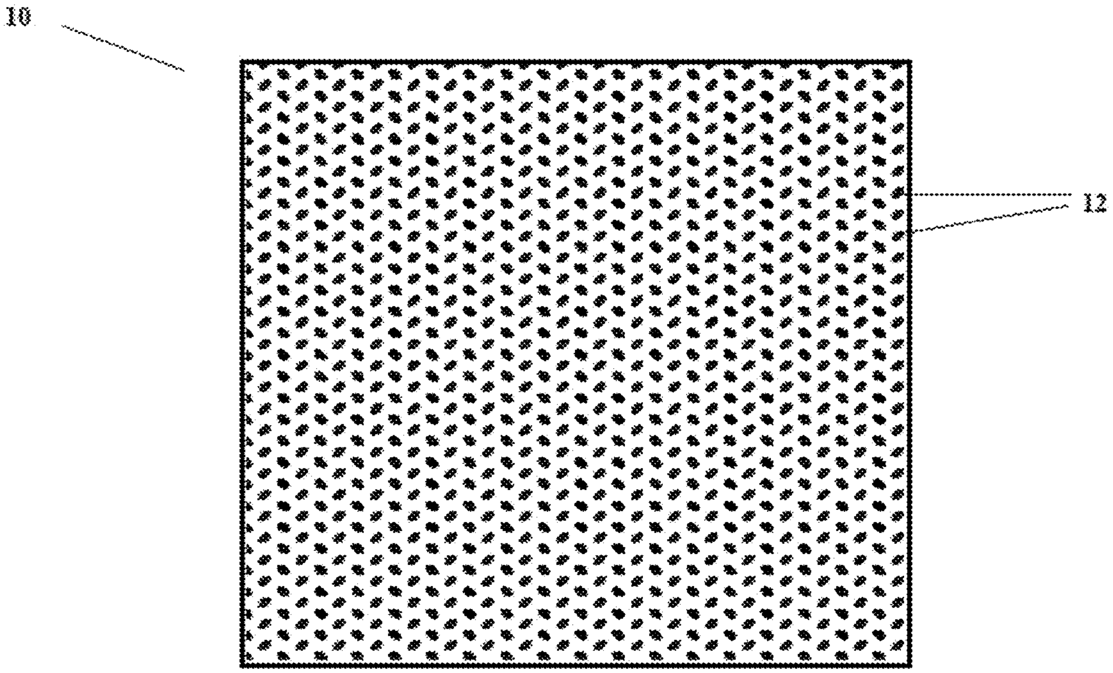
FIG. 1C illustrates an example bonding pattern for a DHL nonwoven layer in accordance with certain embodiments of the invention.
Figure 1D:
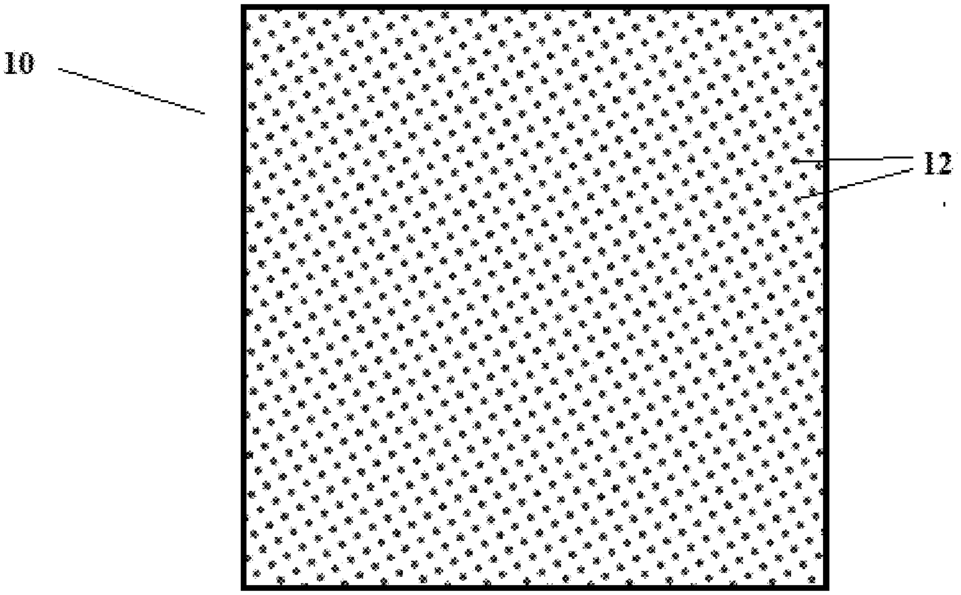
FIG. 1D illustrates another example bonding pattern for a DHL nonwoven layer in accordance with certain embodiments of the invention.

The first DHL nonwoven layer, in accordance with certain embodiments of the invention may comprise a first bonded area comprising about 15% or less, such as about 14% or less, or about 12% or less, or about 10% or less, or about 8% or less, such as at most about any of the following: 15, 14, 13, 12, 11, 10, 9, 8, 7, and 6% and/or at least about any of the following: 4, 5, 6, 7, 8, 9, and 10%. The first bonded area, in accordance with certain embodiments of the invention, may be defined by a first plurality of discrete first bond sites. FIGS. 1A and 1B, for example, illustrates a plurality of discrete first bond sites 12. In accordance with certain embodiments of the invention, the first plurality of discrete first bond sites may comprise thermal bond sites, such as thermal point bonds or ultrasonic bond points. FIG. 1C illustrates an example bonding pattern for a DHL nonwoven layer 10 in accordance with certain embodiments of the invention, in which each of the plurality of discrete bond sites 12 are generally oblong or oval in geometry and define a bonded area of about, for example, 18%. In this regard, each of the individual discrete bond sites may include a longest dimension and a shortest dimension (e.g., being perpendicular to the longest dimension) in which the ratio of the longest dimension to the shortest dimension ranges from about 1.3 to about 3, such as at most about any of the following: 3, 2.8, 2.6, 2.4, 2.2, 2.0, 1.8, 1.7, 1.6, and 1.5% and/or at least about any of the following: 1.2, 1.3, 1.4, 1.5, 1.6, 1.7, 1.8, 1.9, and 2.0. FIG. 1D illustrates another example bonding pattern for a DHL nonwoven layer 10 in accordance with certain embodiments of the invention, in which each of the plurality of discrete bond sites 12 are generally circular or round in geometry and define a bonded area about, for example, 12%.

In accordance with certain embodiments of the invention, the first plurality of discrete first bond sites may have an average distance between adjacent first bond sites from about 0.5 mm to about 10 mm, such as at most about any of the following: 10, 9, 8, 7, 6, 5, 4, 3.5, 3, and 2 mm and/or at least about any of the following: 0.5, 0.6, 0.7, 0.8, 0.9, 1, 1.5, 2, 2.5, and 3 mm. Additionally or alternatively, the discrete first bond sites may comprise an average area from about 0.7 $mm^2$ to about 3 $mm^2$, such as at most about any of the following: 3, 2.5, 2.25, 2, 1.75, 1.5, 1.25, 1, and 0.75 $mm^2$ and/or at least about any of the following: 0.5, 0.6, 0.7, 0.75, 0.8, 0.9, 1, and 1.25 $mm^2$. In accordance with certain embodiments of the invention, the first plurality of crimped multi-component fibers comprise one or more crimped portions located between adjacent first bond sites. In this regard, the first DHL nonwoven fabric may be easily extendable or elongated in one or more directions in the x-y plane due to the "slack" between adjacent discrete bond sites due to the crimped portions of the multi-component crimped fibers located between the adjacent first bond sites.

The first plurality of discrete first bond sites may independently extend from about 25% to about 100% through the first DHL nonwoven layer in a z-direction, such as at most about any of the following: 100, 85, 75, 65, 50, 35, and 25% and/or at least about any of the following: 10, 15, 20, 25, 35, and 50%. As illustrated in FIGS. 1A and 1B, for example, any discrete first bond sites that extend completely through the z-direction of the first DHL nonwoven layer may bond the first DHL nonwoven layer to the underlying scrim.

In accordance with certain embodiments of the invention, the first DHL nonwoven layer may comprises a first basis weight from about 5 to about 25 gsm. such as at most about any of the following: 25, 20, 15, 12, 10, 8, and 5 gsm and/or at least about any of the following: 5, 8, 10, 12, and 15 gsm. As noted above, the first DHL nonwoven layer may have a first density. In this regard, the first DHL nonwoven layer may comprise from about 60 $kg/m^3$ or less, such as at most about any of the following: 70, 60, 55, 50, 45, 40, 35, 30, 25, and 20 kg/m$^3$ and/or at least about any of the following: 10, 15, 20, 25, 30, 35, 40, 45, 50, and 55 kg/m$^3$.

In accordance with certain embodiments of the invention, the nonwoven fabric may further comprise a second DHL nonwoven layer comprising a second plurality of crimped multi-component fibers, in which the second DHL nonwoven layer may be bonded directly or indirectly to the second side of the scrim. FIGS. 1A and 1B, for instance, illustrates certain embodiments of the invention including a second DHL nonwoven layer. The second DHL nonwoven layer may have a second density, in which the scrim density is larger than the second density. In this regard, the second DHL nonwoven layer comprising the second plurality of crimped multi-component fibers may have any of the previously disclosed features and/or properties disclosed with respect to the first DHL nonwoven layer. For instance, the first DHL nonwoven layer and the second DHL nonwoven layer may be the same or different, for example, within the present disclosure. That is, the features of the first DHL nonwoven layer and the second DHL nonwoven layer may be selected independently of each other.

The nonwoven fabric, in accordance with certain embodiments of the invention may further comprise one or more intermediate nonwoven layers located (i) between the scrim and the first DHL nonwoven layer and/or (ii) between the scrim and the second DHL nonwoven layer. The one or more intermediate nonwoven layers may comprise an intermediate plurality of crimped multi-component fibers and/or non-crimped fibers. In accordance with certain embodiments of the invention, the plurality of discrete bond sites (e.g., first and/or second discrete bond sites) may extend through the outermost DHL nonwoven layer, through the one or more intermediate nonwoven layers, and to the scrim. Additionally or alternatively, the plurality of discrete bond sites (e.g., first and/or second discrete bond sites) may extend through the outermost DHL nonwoven layer and extend only a portion of the way through the z-direction of the one or more intermediate nonwoven layers. In this regard, the one or more intermediate nonwoven layers may be bonded to the scrim such that the outermost DHL nonwoven layer(s) is indirectly bonded to the scrim.

In accordance with certain embodiments of the invention, the scrim may comprise a nonwoven fabric comprising one or more spunbond layers, one or more meltblown layers, one or more carded nonwoven layers, one or more mechanically bonded nonwoven layers, or any combination thereof. For instance, the scrim may comprise a plurality of spunbond layers including a first spunbond layer and a second spunbond layer. In accordance with certain embodiments of the invention, the scrim may comprises at least one meltblown layer located directly or indirectly between the first spunbond layer and the second spunbond layer.

The scrim may comprise mono-component fibers, multi-component fibers, or both. The cross-sectional shape of the fibers forming the scrim may comprise round cross-sectional fibers, non-round cross-sectional fibers, or a combination thereof. For example, the scrim may include a plurality of individual layers in which at least one layer includes or consists of non-round fibers and/or at least one layer includes or consists of round fibers. The scrim, for example, may comprise from about 25% to about 100% of round cross-sectional fibers, such as at most about any of the following: 100, 95, 90, 85, 75, and 50% and/or at least about any of the following: 10, 20, 25, 35, 50, and 75%. Additionally or alternatively, the scrim comprises from about 25% to about 100% of non-round cross-sectional fibers, such as at most about any of the following: 100, 95, 90, 85, 75, and 50% and/or at least about any of the following: 10, 20, 25, 35, 50, and 75%. In accordance with embodiments of the invention including non-round cross-sectional fibers as part of the scrim, these non-round cross-sectional fibers may comprise an aspect ratio of greater than 1.5:1, such as at most about any of the following: 10:1, 9:1, 8:1, 7:1, 6:1, 5:1, 4:1, 3:1, and 2:1 and/or at least about any of the following: 1.5:1, 2:1, 2.5:1, 3:1, 4:1, 5:1, and 6:1. In accordance with certain embodiments of the invention, the scrim may comprise crimped fibers and/or non-crimped fibers. The scrim, for example, may comprise from about 50% to about 100% non-crimped fibers, such as at most about any of the following: 100, 95, 90, 85, 75, and 50% and/or at least about any of the following: 10, 20, 25, 35, 50, and 75%. The scrim may, in accordance with certain embodiments of the invention, may be devoid of crimped fibers.

In accordance with certain embodiments of the invention, the scrim comprises a scrim bonded area comprising about 15% or more, such as about 18% or more, or about 20% or more, or about 22% or more, or about 25% or more, such as at most about any of the following: 50, 40, 35, 30, 25, 22, 20, 18, and 16% and/or at least about any of the following: 15, 16, 18, 20, 22, 25, and 30%. The scrim bonded area may be defined by a plurality of discrete scrim bond sites, such as illustrated in FIGS. 1A and 1B. The plurality of discrete scrim bond sites may comprise thermal bond sites, such as thermal point bonds and/or ultrasonic bonds. The plurality of discrete scrim bond sites may have an average distance between adjacent scrim bond sites from about 0.1 mm to about 10 mm, such as at most about any of the following: 10, 9, 8, 7, 6, 5, 4, 3.5, 3, 2, and 1 mm and/or at least about any of the following: 0.1, 0.25, 0.5, 0.75, 1, 1.5, 2, 2.5, and 3 mm; wherein the average distance between adjacent scrim bond sites is smaller than the average distance between adjacent first bond sites. In accordance with certain embodiments of the invention, for example, the average distance between adjacent first bond sites may be from about 1.2 times to 10 times greater than the average distance between adjacent scrim bond sites. For example, the average distance between adjacent first bond sites may be at most about any of the following: 10, 9, 8, 7, 6, 5, 4, 3.5, 3, and 2 times greater than the average distance between adjacent scrim bond sites and/or at least about any of the following: 1.2, 1.3, 1.4, 1.5, 2, 3, 4, and 5 times greater than the average distance between adjacent scrim bond sites. Additionally or alternatively, the discrete scrim bond sites may comprise an average area from about 0.3 μm$^2$ to about 2 mm$^2$, such as at most about any of the following: 2, 1.8, 1.6, 1.4, 1.2, 1.0, 0.8, 0.6, 0.4, and 0.3 mm$^2$ and/or at least about any of the following: 0.3, 0.4, 0.5, 0.6, 0.7, 0.8, 0.9, 1, 1.2, 1.4, 1.6, 1.8, and 2 mm$^2$. In accordance with certain embodiments of the invention, the scrim may be devoid of a crimped fiber portion located between adjacent scrim bond sites. Additionally or alternatively, the scrim may include bonds other than discrete thermal bonds, such as mechanical bonding (e.g., needle-punching or hydroentanglement), through-air-bonding, or adhesive bonding, to form the consolidated scrim.

In accordance with certain embodiments of the invention, the scrim may comprise a scrim basis weight from about 4 to about 30 gsm, such as at most about any of the following: 30, 25, 20, 15, 12, 10, 8, 6, and 4 gsm and/or at least about any of the following: 2, 3, 4, 5, 6, 8, 10, and 12 gsm. Additionally or alternatively, the scrim density may comprise from about 80 to about 150 kg/m$^3$, such as at most about any of the following: 150, 140, 130, 120, 110, and 100 $kg/m^3$ and/or at least about any of the following: 80, 90, 100, and 110 $kg/m^3$.

The scrim, in accordance with certain embodiments of the invention, may comprise a synthetic polymer. The synthetic polymer, for example, may comprise a polyolefin, a polyester, a polyamide, or any combination thereof. By way of example only, the synthetic polymer may comprises at least one of a polyethylene, a polypropylene, a partially aromatic or fully aromatic polyester, an aromatic or partially aromatic polyamide, an aliphatic polyamide, or any combination thereof. Additionally or alternatively, the scrim may comprise a biopolymer, such as polylactic acid (PLA), polyhydroxyalkanoates (PHA), and poly(hydroxycarboxylic) acids. Additionally or alternatively, the scrim may comprise a natural or synthetic cellulosic fiber.

In accordance with certain embodiments of the invention, the nonwoven fabric comprises a density ratio between the scrim density and the first density in which the density ratio may comprise from about 15:1 to about 1.3:1, such as at most about any of the following: 15:1, 12:1, 10:1, 8:1, 6:1, 5:1, 4:1, 3:1, and 2:1 and/or at least about any of the following: 1.3:1, 1.5:1, 1.75:1, 2:1, 3:1, 4:1, 5:1, 6:1, and 8:1. In accordance with certain embodiments of the invention, the nonwoven fabric comprises a bond area ratio between the scrim bond area and the first bond area, in which the bond area ratio may comprise from about 1.25:1 to about 10:1, such as at most about any of the following: 10:1, 8:1, 6:1, 5:1, 4:1, 3:1, and 2:1 and/or at least about any of the following: 1.25:1, 1.3:1, 1.4:1, 1.5:1, 2:1, 3:1, 4:1, and 5:1. Additionally or alternatively, the nonwoven fabric may comprise a percent elongation ratio in a machine direction at 5 N/5 cm between the first DHL nonwoven layer and the scrim. In accordance with certain embodiments of the invention, the percent elongation ratio in a machine direction at 5 N/5 cm between the first DHL nonwoven layer and the scrim may comprise from about 1.5:1 to about 20:1, such as at most about any of the following: 20:1, 18:1, 16:1, 15:1, 14:1, 13:1, 12:1, 11:1, 10:1, 9:1, 8:1, 7:1, 6:1, 5:1, 4:1, 3:1, and 2:1 gsm and/or at least about any of the following: 1.5:1, 1.75:1, 2:1, 2.25:1, 2.5:1, 2.75:1, 3:1, 3.5:1, 4:1, 4.5:1, and 5:1. Additionally or alternatively, the nonwoven fabric may include a percent width reduction ratio in a cross-direction at 0.1 N/mm between the first DHL nonwoven layer and the scrim. In accordance with certain embodiments of the invention, the percent width reduction ration in a cross-direction at 0.1 N/mm between the first DHL nonwoven layer and the scrim may comprise from about 1.25:1 to about 5:1, such as at most about any of the following: 5:1, 4:1, 3:1, 2:1, and 1.5:1 gsm and/or at least about any of the following: 1.25:1, 1.5:1, 1.75:1, 2.:1, and 3:1.

In accordance with certain embodiments of the invention, the nonwoven fabric may comprise a percent elongation in a machine direction at 5 N/5 cm from about 0.5% to about 8%, such as at most about any of the following: 8, 7.5, 7, 6.5, 6, 5.5, 5, 4.5, 4, 3.5, 3, 2.5, 2, 1.5, and 1% and/or at least about any of the following: 0.5, 0.75, 1, 1.5, 2, 2.5, 3, 3.5, and 4%. Additionally or alternatively, the nonwoven fabric may comprise a percent width reduction in a cross-direction at 0.1 N/mm from about 3% to about 25%, such as at most about any of the following: 25, 20, 15, 12, 10, 8, 6, and 5% and/or at least about any of the following: 3, 4, 5, 6, 8, 10, 12, and 15%.

In accordance with certain embodiments of the invention, the first DHL nonwoven layer has a first basis weight and the scrim has a scrim-basis weight, in which the first basis weight and the scrim basis weight differ by no more than 10 gsm (e.g., no more than about 8, 5, 3, or 1 gsm) and a z-directional thickness of the first DHL nonwoven layer comprise from about 2 to about 15 times larger than a z-directional thickness of the scrim, such as at most about any of the following: 15, 12, 10, 8, 6, 5, 4, 3, and 2 times larger than a z-directional thickness of the scrim and/or at least about any of the following: 1.25, 1..5, 1.75, 2, 2.5, 3, and 5 times larger than a z-directional thickness of the scrim.

In accordance with certain embodiments of the invention, the nonwoven fabric may comprise a first side defined by the first DHL nonwoven layer and a second side defined by the scrim. In this regard, the first surface may be incorporated into a final article of manufacture in a manner such that the loftiness associated with the first DHL nonwoven layer can be maintained while the second side may be used for attachment to one or more other components of an intermediate or final article of manufacture.

In another aspect, the present invention provides a method of forming a nonwoven fabric as disclosed herein. The methods may comprise forming or providing a first DHL nonwoven layer comprising a first plurality of crimped multi-component fibers (e.g., discontinuous fibers, continuous fibers, or a combination thereof), in which the first DHL nonwoven layer has a first density and a first percent elongation in a machine direction at 5 N/5 cm. The method may further comprise forming or providing a scrim (e.g., a nonwoven) including a first side and a second side, in which the scrim has a scrim density that is larger than the first density and scrim percent elongation in the machine direction at 5 N/5 cm that is less than the first percent elongation. In accordance with certain embodiments of the invention, the method may comprise directly or indirectly bonding the first side of the scrim to the first DHL nonwoven layer and optionally directly or indirectly bonding the second side of the scrim to the second DHL nonwoven layer to provide a nonwoven fabric as described herein. In accordance with certain embodiments of the invention, the method may comprise melt-spinning a precursor scrim and consolidating the precursor scrim, such as by mechanical bonding (e.g., needle-punching or hydroentanglement), thermal bonding (e.g., through-air-bonding, thermal calendering, or ultrasonic bonding), or adhesive bonding, to form the scrim. Additionally or alternatively, the method may comprise melt-spinning a precursor first DHL nonwoven layer directly or indirectly onto the scrim and consolidating the precursor DHL nonwoven layer to form the DHL nonwoven layer and in certain embodiments to simultaneously bond the first side of the scrim to the first DHL nonwoven layer. The consolidation of the of the precursor DHL nonwoven layer may be carried out by a variety of means including, for example, thermal bonding (e.g., through-air-bonding, thermal calendering, or ultrasonic bonding).

Figure 5:
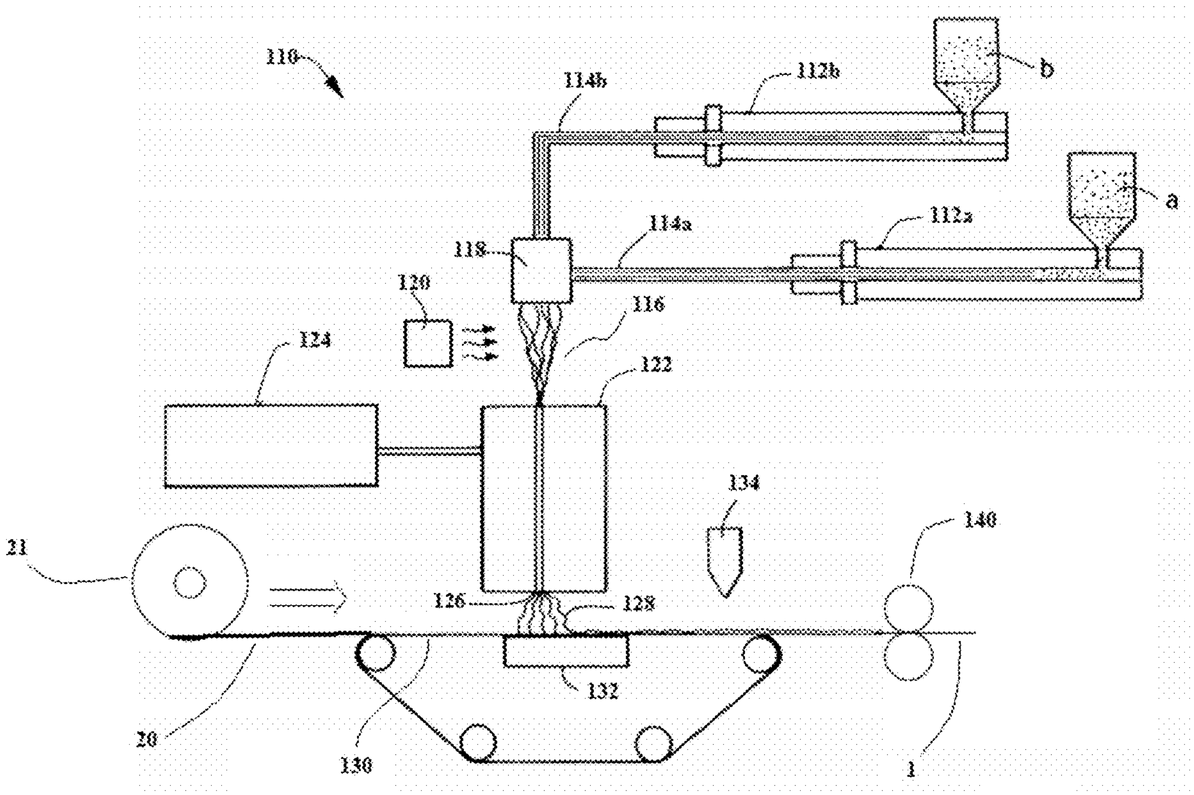
FIG. 5 is a schematic for a production line suitable for forming a nonwoven fabric in accordance with certain embodiments of the invention.

FIG. 5 illustrates an example production line suitable for forming a nonwoven fabric in accordance with certain embodiments of the invention. As shown in FIG. 5, for instance, polymers A and B are fed from extruders 112*a* and 112*b* through respective polymer conduits 114*a* and 114*b* to a spin pack assembly 118. A spin pack assembly, for example, may include a housing and a plurality of distribution plates stacked one on top of the other with a pattern of openings arranged to create flow paths for directing polymer components A and B separately through the spin pack assembly. The distribution plates are coupled to a spin plate or spinneret which often has a plurality of openings and which are commonly arranged in one or more rows. A downwardly extending curtain of filaments 116 (e.g., multi-component filaments formed from polymer A and polymer B) can be formed when the molten polymers are extruded through the openings of the spinneret. In accordance with certain embodiments of the invention, for instance, the spin pack assembly 118 may be arranged to form multicomponent fibers of a desired configuration, such as those described in the present disclosure. During production, the spin pack 118 may be maintained at a sufficiently high temperature to maintain polymers A and B in a molten state at the desired viscosity. With ethylene and/or propylene polymers, for example, the spin pack temperature may desirably be maintained at temperatures between about 400° F. (204° C.) and about 500° F. (260° C.).

As shown in FIG. 5, the production line 110 can also include one or more quench blowers 120 positioned adjacent the curtain of extruded filaments 116 extending from the spin pack assembly 118. Fumes and air heated from the high temperature of the molten polymer exiting the spin pack assembly, can be collected by a vacuum (not shown) while air from the quench air blower 120 quenches the newly formed filaments 116. The quench air can be directed from only one side of the filament curtain as shown in FIG. 5, or from both sides of the filament curtain. As used herein, the term "quench" simply means reducing the temperature of the fibers using a medium that is cooler than the fibers such as, for example, ambient air. In this regard, quenching of the fibers can be an active step or a passive step (e.g., simply allowing ambient air to cool the molten fibers). In accordance with certain embodiments of the invention, the fibers may be sufficiently quenched to prevent their sticking/adhering to the draw unit. Additionally or alternatively, the fibers may be substantially uniformly quenched such that significant temperature gradients are not formed within the quenched fibers. A fiber draw unit 122 may be positioned below both the spin pack assembly 118 and quench blower 120 to receive the quenched filaments. In accordance with certain embodiments of the invention, the fiber draw unit is not particularly limited. By way of example only, the fiber draw unit may include a linear fiber aspirator and eductive guns. Additional apparatus for melt-attenuating the quenched filaments, without additional heat or stretching steps, are also disclosed in U.S. Pat. No. 5,665,300 to Brignola et al., the contents of which are incorporated by reference.

In accordance with certain embodiments of the invention, an example fiber draw unit 122 can include an elongate vertical passage through which the filaments are drawn by aspirating air entering from the sides of the passage and flowing downwardly through the passage. The temperature of the aspirating air can be lower than the temperature of the quenched filaments. A blower 124 may supply drawing air to the fiber draw unit 122. The cool aspirating air pulls the semi-molten filaments through the column or passage of fiber draw unit 122 and reduces the fiber diameter as well as the temperature of the partially quenched filaments. Thus, the filaments are melt-attenuated in the fiber draw unit 122. In one aspect, the draw air or aspirating air temperature can be less than about 38° C. The draw or aspirating air temperature may, for example, be between about 15° C. and about 30° C. (e.g., between about 15° C. and about 25° C.). The draw air temperature can be measured from the input air such as, for example, the air temperature within the draw unit manifold. The fiber draw unit in accordance with certain embodiments of the invention provides a draw ratio of at least about 100/1 or from at least about 450/1 to about 1800/1. The draw ratio, for instance, refers to the ratio of final velocity of the fully drawn or melt-attenuated filament to the velocity of the filament upon exiting the spin pack.

FIG. 5 illustrates an embodiment in which a supply roll 21 including a scrim 20 (e.g., pre-bonded or consolidated scrim) provides the scrim 20 onto an endless forming surface 130. The endless forming surface 130 may be positioned below the fiber draw unit 122. In this regard, the scrim 20 is deposited on top of the endless forming surface 130 and the continuous attenuated filaments 128 from the outlet opening 126 of the fiber draw unit 122 are deposited onto the scrim 20. A vacuum 132, positioned below the endless forming surface 130, pulls the attenuated filaments 128 onto the scrim 20 that is overlying the endless forming surface 130. The deposited fibers or filaments comprise an unbonded, nonwoven web of , for example, continuous filaments. The actual formation of crimp is believed to occur as the attenuating force is removed from the filaments. In this regard, therefore, crimping of the filaments is believed to occur prior to and/or shortly after the continuous filaments are deposited upon the scrim. Since the filaments, in accordance with certain embodiments of the invention, spontaneously crimp a nonwoven web of crimped filaments can be formed without the need for additional heating and/or stretching operations after web formation. The nonwoven web can then, optionally, be lightly bonded or compressed to as disclosed herein. As an example, the unbonded web can be lightly bonded using a focused stream of hot air using a hot-air knife 134 and/or by calendar bonding rolls 140 (e.g., thermal point bonding) to provide a nonwoven fabric 1 in accordance with certain embodiments of the invention.

Figure 6:
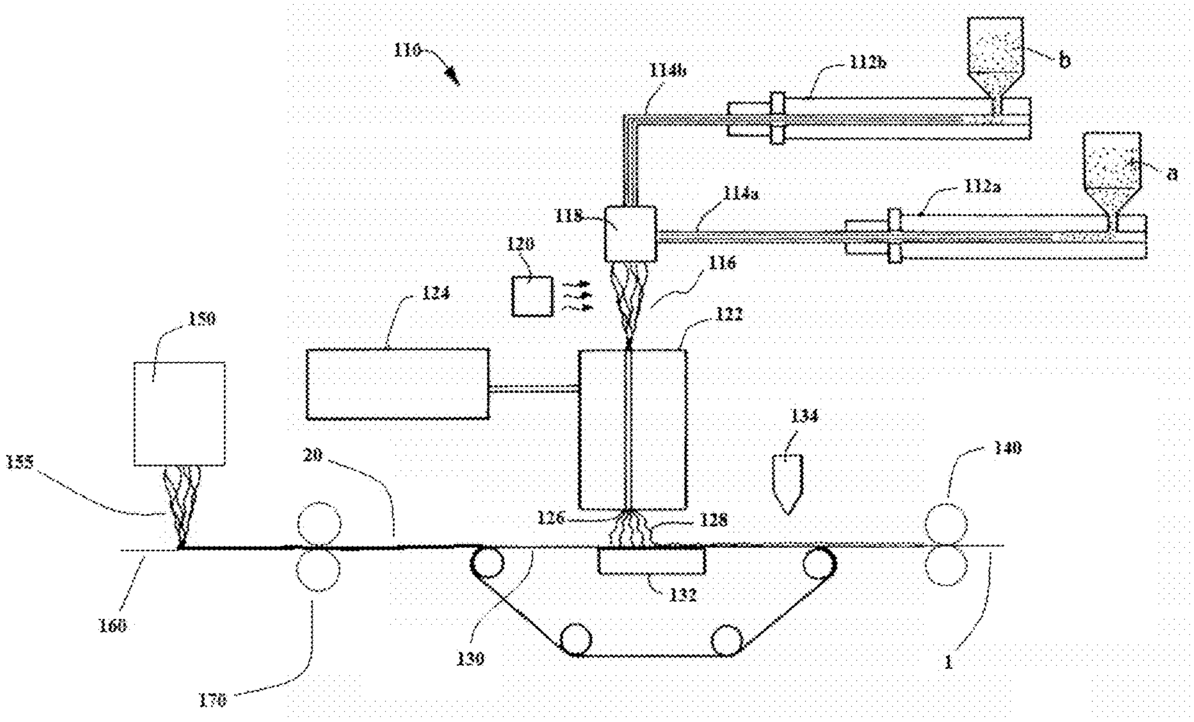
FIG. 6 is a schematic for a production line suitable for forming a nonwoven fabric in accordance with certain embodiments of the invention.

FIG. 6 illustrates an example production line suitable for forming a nonwoven fabric in accordance with certain embodiments of the invention, in which the scrim is not provided as a pre-bonded or consolidated material. As shown in FIG. 6, the production line 110 can include an upstream fiber producing unit 150 (e.g., melt-spinning operation, electro-spinning operation, etc.) that provides a plurality of pre-scrim filaments 155 that may be deposited onto a scrim-forming surface 160 to provide a precursor scrim. The pre-scrim filaments (e.g., meltspun filaments) forming the precursor scrim may be conveyed through a scrim-bonding unit 170 to consolidate the precursor scrim to form scrim 20. As described throughout the present disclosure, the scrim-bonding unit 170 is not particularly limited and may include mechanical bonding (e.g., needle-punching or hydroentanglement), thermal bonding (e.g., through-air-bonding, thermal calendering, or ultrasonic bonding), or adhesive bonding.

In accordance with certain embodiments of the invention, the method may comprise directly or indirectly bonding the first DHL nonwoven layer and the scrim, such as via thermal bonding including thermal calendar bonding and/or ultrasonic bonding. For example, the step or steps of bonding the first DHL nonwoven layer and the scrim may comprise forming or imparting a first plurality of discrete first bond sites as shown, for example, in FIGS. 1A and 1B. In this regard, the discrete first bond sites may individually extend in the z-direction (e.g., thickness) of the first DHL nonwoven layer 10 from about 25% to about 100% through the first DHL nonwoven layer. The discrete first bond sites, for example, may independently extend completely through the z-direction of the first DHL nonwoven layer and bond the first DHL nonwoven layer to the underlying scrim. The scrim, as illustrated by FIG. 1A and 1B, may comprise discrete scrim bond sites that may comprise larger bonded areas in which adjacent discrete scrim bond sites are closer together than the discrete first bond sites. In accordance with certain embodiments of the invention, for example, the formation or imparting of the first plurality of discrete first bond sites may comprise independently extending or imparting these discrete first bond sites through varying depths of the nonwoven fabric (e.g., z-direction of the nonwoven fabric). In accordance with certain embodiments of the invention, for instance, the method may comprise forming the first plurality of discrete first bond sites, in which one or more of the discrete first bond sites may randomly overlap, pass-through, or coincide with one or more underlying scrim bond sites as illustrated, for example, in FIG. 1B. In accordance with certain embodiments of the invention, for example, one or more of the discrete first bond sites may extend completely through the z-direction of the first DHL nonwoven layer and completely through the scrim layer. In this regard, FIG. 1B illustrates discrete first bond sites 12*a*, 12*b*, 12*c*, 12*d*, 12*e* randomly intersecting with scrim bond sites 22. Such embodiments as those illustrated by FIG. 1B, for instance, may provide an overall bulk and loftiness on both sides of the nonwoven fabric while the scrim being sandwiched between the outer DHL nonwoven layers imparts structural integrity to the nonwoven fabric in the x-y dimensions.

In another aspect, the present invention provides a hygiene-related article (e.g., diaper), in which one or more of the components of the hygiene-related article comprises a nonwoven fabric as described and disclosed herein. Nonwoven fabric, in accordance with certain embodiments of the invention, may be incorporated into infant diapers, adult diapers, and femcare articles (e.g., or as a component of a topsheet, a backsheet, a waistband, as a legcuff, etc.).

EXAMPLES

The present disclosure is further illustrated by then following examples, which in no way should be construed as being limiting. That is, the specific features described in the following examples are merely illustrative and not limiting.

Ten (10) separate nonwovens were tested for machine direction elongation and cross-direction width loss for comparison. The first nonwoven tested was a 17 gsm SMMMS nonwoven formed from polypropylene mono-component fibers and having a 18.8% bonded area. This nonwoven is identified as Nonwoven #1 in FIGS. 7A-7B, 8, and 9. Such a nonwoven may be suitable as a scrim in accordance with certain embodiments of the invention. The second nonwoven tested was a 30 gsm DHL nonwoven layer formed from two beams of crimped bi-component spunbond fibers having a round cross-section. The DHL nonwoven layer had a 12% bonded area. This nonwoven is identified as Nonwoven #2 in FIGS. 7A-7B, 8, and 9. The third nonwoven tested was a "semi-loft" nonwoven layer including 50% by weight of a web of mono-component round spunbond fibers from a first beam that was combined with 50% by weight of a web of crimped bi-component spunbond fibers. The semi-loft nonwoven layer had a 12% bonded area. This nonwoven is identified as Nonwoven #3 in FIGS. 7A-7B, 8, and 9. The fourth nonwoven tested was a 13 gsm Nuvisoft fabric formed from ribbon-shaped mono-component spunbond fibers and had a 14% bonded area. This nonwoven is identified as Nonwoven #4 in FIGS. 7A-7B, 8, and 9. The fifth nonwoven was a 18 gsm through-air-bonded polypropylene/polyethylene bico carded web. The Sixth nonwoven tested (i.e., Nonwoven#6) was an example embodiment of the present invention. In particular, Nonwoven #6 was a 20 gsm nonwoven with helically crimped round bicomponent spunbond filaments attached to a pre-bonded "scrim" of round homopolymer filaments. The seventh nonwoven tested (i.e., Nonwoven #7) is another example embodiment of the present invention. In particular, Nonwoven #7 was a 20 gsm nonwoven with helically crimped ribbon shaped bicomponent spunbond filaments attached to a pre-bonded "scrim" of round homopolymer filaments. The eighth nonwoven tested (Nonwoven #8) was a High loft 20 gsm with layers of helically crimped round spunbond bicomponent fibers. The ninth nonwoven tested (i.e., Nonwoven #9) was similar to Nonwoven #8, except that a different polymer blend was used to create the helical crimp of round fibers. The tenth nonwoven tested (i.e., Nonwoven #10) was an example of a nonwoven having 100% ribbon shaped bicomponent helically crimped fibers. Due to the shape of the ribbon filaments, these fibers produced a very tight crimp radius, generating very high free crimp length as compared to similar round bicomponent fibers and results in higher fabric elongations as the fibers have more length between the bonds under crimped conditions to elongate freely. In this regard, higher fabric elongations can be seen in the MD% elongation of this web (i.e., Nonwoven #10) in the graph illustrated in FIG. 7.

Figure 7:
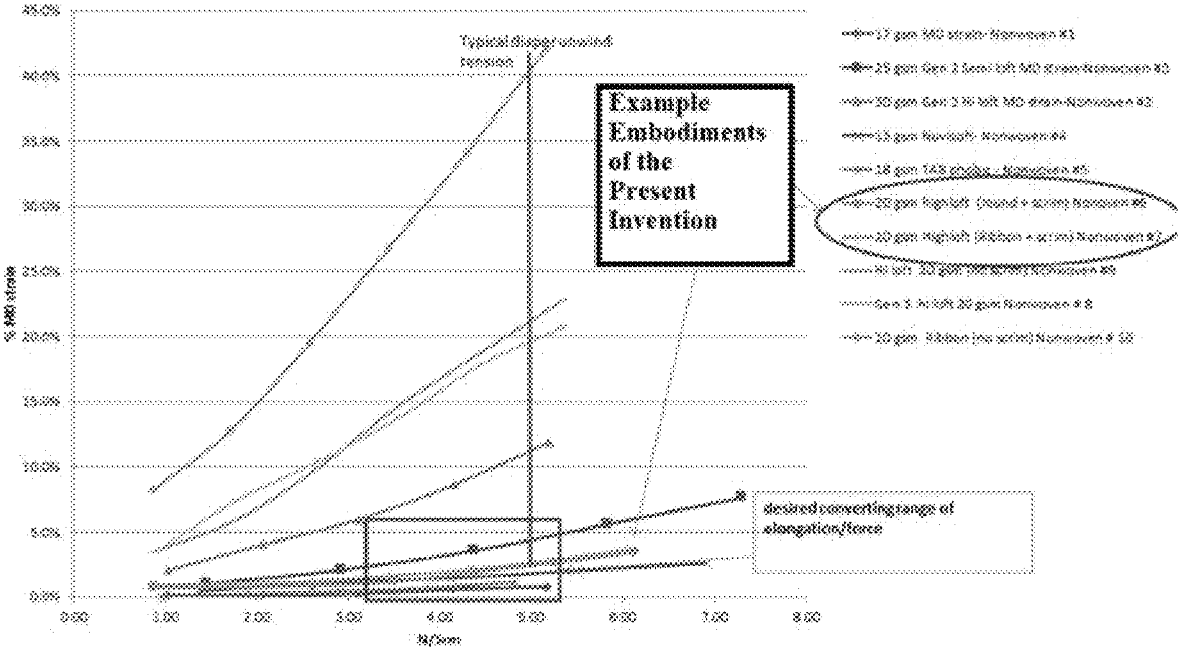
FIG. 7 is a graph illustrating the percent elongation in the machine direction as a function of force applied in the machine direction.
Figure 8:
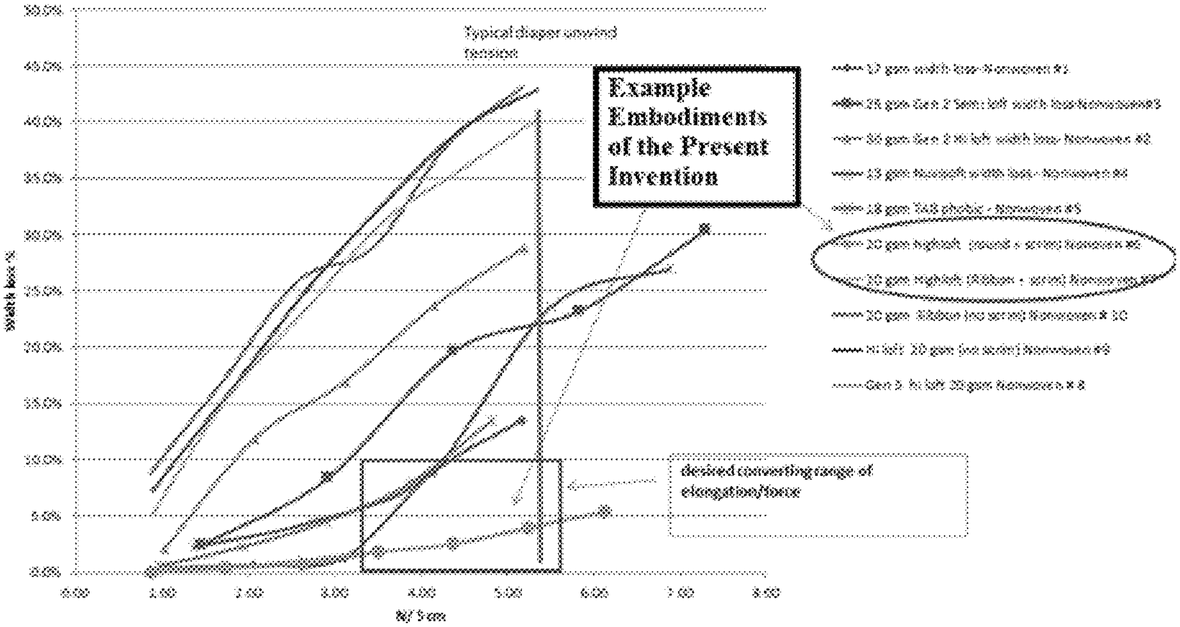
FIG. 8 is a graph illustrating the percent width loss in the cross-direction as a function of force applied in the machine direction.

The testing data is provided in Table 1 below. FIG. 7 is a graph illustrating the percent elongation in the machine direction as a function of force applied in the machine direction based on the data from Table 1. FIG. 8 is a graph illustrating the percent width loss in the cross-direction as a function of force applied in the machine direction based on the data from Table 1. The data from Table 1 as well as FIGS. 8 and 9 illustrate that certain embodiments in accordance with the present invention realize a beneficial reduction in elongation while retaining loft (e.g., traditional monocomponent low loft webs are in the same %MD strain as nonwoven fabrics including the combination of the high loft/DHL with a scrim). The data from Table 1 as well as FIGS. 8 and 9 further demonstrate the reduction in width loss of the scrim reinforced high loft/DHL nonwoven fabrics in accordance with certain embodiments of the present invention.

| Sample | Weight (grams) | Newtons force | N/ 5 cm | Left | Right | Width | Length | g/mm |
|---|---|---|---|---|---|---|---|---|
| Nonwoven #1: | 0 | 0 | 0 | 52 | 289 | 237 | 890 | 0 |
| 17 gsm-SMMMS; | 500 | 4.90 | 1.03 | 52 | 288 | 236 | 891 | 2.1277 |
| 235 mm width | 1000 | 9.81 | 2.07 | 52.5 | 288 | 235.5 | 891 | 4.2553 |
| | 1500 | 14.71 | 3.10 | 53 | 287 | 234 | 892 | 6.3830 |
| | 2000 | 19.61 | 4.14 | 54 | 270 | 216 | 895 | 8.5106 |
| | 2500 | 24.52 | 5.17 | 55 | 260 | 205 | 897 | 10.6383 |
| Nonwoven #2: | 0 | 0.00 | 0.00 | 41 | 277 | 236 | 985 | 0.00 |
| 30 gsm High-Loft; | 500 | 4.90 | 1.04 | 46 | 277 | 231 | 1005 | 2.1277 |
| 235 mm width | 1000 | 9.81 | 2.08 | 52 | 260 | 208 | 1025 | 4.2553 |
| | 1500 | 14.71 | 3.12 | 57 | 253 | 196 | 1044 | 6.3830 |
| | 2000 | 19.61 | 4.16 | 65 | 245 | 180 | 1070 | 8.5106 |
| | 2500 | 24.52 | 5.19 | 70 | 238 | 168 | 1102 | 10.6383 |

-continued

| | | | | | | | | |
|---|---|---|---|---|---|---|---|---|
| Nonwoven #3: | 0 | 0 | 0 | 42 | 210 | 168 | 980 | 0 |
| 25 gsm Semi-Loft; | 500 | 4.90 | 1.46 | 44 | 208 | 164 | 990 | 2.9412 |
| 170 mm width | 1000 | 9.81 | 2.92 | 49 | 203 | 154 | 1000 | 5.8824 |
| | 1500 | 14.71 | 4.38 | 55 | 190 | 135 | 1015 | 8.8235 |
| | 2000 | 19.61 | 5.84 | 61 | 190 | 129 | 1035 | 11.7647 |
| | 2500 | 24.52 | 7.30 | 68 | 185 | 117 | 1055 | 14.7059 |
| Nonwoven #4: | 0 | 0 | 0 | 18 | 196 | 178 | 900 | 0 |
| 13 gsm Nuvisoft; | 500 | 4.90 | 1.38 | 20 | 194 | 174 | 904 | 2.8090 |
| 178 mm width | 1000 | 9.81 | 2.75 | 22 | 192 | 170 | 910 | 5.6180 |
| | 1500 | 14.71 | 4.13 | 25 | 187 | 162 | 913 | 8.4270 |
| | 2000 | 19.61 | 5.51 | 40 | 176 | 136 | 918 | 11.2360 |
| | 2500 | 24.52 | 6.89 | 40 | 170 | 130 | 923 | 14.0449 |
| Nonwoven #5: | 0 | 0 | 0 | 0 | 254 | 254 | 805 | 0 |
| 18 gsm TAB SB; | 500 | 4.90 | 0.97 | 0 | 253 | 253 | 805 | 1.9685 |
| 254 mm width | 1000 | 9.81 | 1.93 | 0 | 250 | 250 | 807 | 3.9370 |
| | 1500 | 14.71 | 2.90 | 0 | 246 | 246 | 809 | 5.9055 |
| | 2000 | 19.61 | 3.86 | 0 | 240 | 240 | 811 | 7.8740 |
| | 2500 | 24.52 | 4.83 | 0 | 230 | 230 | 815 | 9.8425 |
| Nonwoven #6: | 0 | 0 | 0 | 0 | 280 | 280 | 692 | 0 |
| 20 gsm High-Loft | 500 | 4.90 | 0.88 | 0 | 280 | 280 | 697 | 1.7857 |
| (Round + Scrim); | 1000 | 9.81 | 1.75 | 1 | 280 | 279 | 697 | 3.5714 |
| 280 mm width | 1500 | 14.71 | 2.63 | 1 | 279 | 278 | 698 | 5.3571 |
| | 2000 | 19.61 | 3.50 | 3 | 278 | 275 | 700 | 7.1429 |
| | 2500 | 24.52 | 4.38 | 4 | 277 | 273 | 705 | 8.9286 |
| | 3000 | 29.42 | 5.25 | 0 | 269 | 269 | 710 | 10.7143 |
| | 3500 | 34.32 | 6.13 | 0 | 265 | 265 | 716 | 12.5000 |
| Nonwoven #7: | 0 | 0 | 0 | 0 | 284 | 284 | 683 | 0 |
| 20 gsm High-Loft | 500 | 4.90 | 0.86 | 0 | 283 | 283 | 689 | 1.7606 |
| (Ribbon + Scrim); | 1000 | 9.81 | 1.73 | 0 | 283 | 283 | 690 | 3.5211 |
| 284 mm width | 1500 | 14.71 | 2.59 | 1 | 282 | 281 | 691 | 5.2817 |
| | 2000 | 19.61 | 3.45 | 2 | 281 | 279 | 694 | 7.0423 |
| | 2500 | 24.52 | 4.32 | 3 | 280 | 277 | 697 | 8.8028 |
| | 3000 | 29.42 | 5.18 | 0 | 273 | 273 | 702 | 10.5634 |
| | 3500 | 34.32 | 6.04 | 0 | 269 | 269 | 708 | 12.3239 |
| Nonwoven #8: | 0 | 0 | 0 | 0 | 285 | 285 | 670 | 0 |
| 20 gsm | 500 | 4.90 | 0.89 | 0 | 270 | 270 | 693 | 1.7544 |
| Gen 3 High-Loft; | 1000 | 9.81 | 1.79 | 0 | 240 | 240 | 720 | 3.5088 |
| 274 mm width | 1500 | 14.71 | 2.68 | 0 | 218 | 218 | 740 | 5.2632 |
| | 2000 | 19.61 | 3.58 | 0 | 196 | 196 | 763 | 7.0175 |
| | 2500 | 24.52 | 4.47 | 0 | 183 | 183 | 790 | 8.7719 |
| | 3000 | 29.42 | 5.37 | 0 | 170 | 170 | 809 | 10.5263 |
| Nonwoven #9: | 0 | 0 | 0 | 0 | 275 | 275 | 623 | 0 |
| 20 gsm | 500 | 4.90 | 0.89 | 0 | 255 | 255 | 645 | 1.8182 |
| High-Loft (no scrim); | 1000 | 9.81 | 1.78 | 0 | 231 | 231 | 660 | 3.6364 |
| 274 mm width | 1500 | 14.71 | 2.67 | 0 | 206 | 206 | 685 | 5.4545 |
| | 2000 | 19.61 | 3.57 | 0 | 185 | 185 | 715 | 7.2727 |
| | 2500 | 24.52 | 4.46 | 0 | 167 | 167 | 740 | 9.0909 |
| | 3000 | 29.42 | 5.35 | 0 | 157 | 157 | 765 | 10.9091 |
| Nonwoven #10: | 0 | 0 | 0 | 0 | 274 | 274 | 820 | 0 |
| 20 gsm | 500 | 4.90 | 0.86 | 0 | 250 | 250 | 887 | 1.8248 |
| Ribbon (no scrim); | 1000 | 9.81 | 1.72 | 0 | 227 | 227 | 925 | 3.6496 |
| 274 mm width | 1500 | 14.71 | 2.58 | 0 | 203 | 203 | 980 | 5.4745 |
| | 2000 | 19.61 | 3.44 | 0 | 195 | 195 | 1040 | 7.2993 |
| | 2500 | 24.52 | 4.30 | 0 | 170 | 170 | 1100 | 9.1241 |
| | 3000 | 29.42 | 5.16 | 0 | 156 | 156 | 1165 | 10.9489 |

| Sample | Weight (grams) | N/mm | PLI | Poisson Ratio | MD strain (%) | Delta W Width | Delta L Length | Width Loss (%) |
|---|---|---|---|---|---|---|---|---|
| Nonwoven #1: | 0 | 0 | 0 | 0 | | | | |
| 17 gsm-SMMMS; | 500 | 0.0209 | 0.1191 | 3.76 | 0.1 | 1 | 1 | 0.4 |
| 235 mm width | 1000 | 0.0417 | 0.2383 | 5.63 | 0.1 | 1.5 | 1 | 0.6 |
| | 1500 | 0.0626 | 0.3574 | 5.63 | 0.2 | 3 | 2 | 1.3 |
| | 2000 | 0.0835 | 0.4766 | 15.77 | 0.6 | 21 | 5 | 8.9 |
| | 2500 | 0.1043 | 0.5957 | 17.17 | 0.8 | 32 | 7 | 13.5 |
| Nonwoven #2: | 0 | 0 | 0 | | | | | |
| 30 gsm High-Loft; | 500 | 0.020865 | 0.119143 | 1.04 | 2.0 | 5 | 20 | 2.1 |
| 235 mm width | 1000 | 0.04173 | 0.238287 | 2.92 | 4.1 | 28 | 40 | 11.9 |
| | 1500 | 0.062596 | 0.35743 | 2.83 | 6.0 | 40 | 59 | 16.9 |
| | 2000 | 0.083461 | 0.476574 | 2.75 | 8.6 | 56 | 85 | 23.7 |
| | 2500 | 0.104326 | 0.595717 | 2.43 | 11.9 | 68 | 117 | 28.8 |
| Nonwoven #3: | 0 | 0 | 0 | | | | | |
| 25 gsm Semi-Loft; | 500 | 0.0288 | 0.1647 | 2.33 | 1.0 | 4 | 10 | 2.4 |
| 170 mm width | 1000 | 0.0577 | 0.3294 | 4.08 | 2.0 | 14 | 20 | 8.3 |
| | 1500 | 0.0865 | 0.4941 | 5.50 | 3.6 | 33 | 35 | 19.6 |
| | 2000 | 0.1154 | 0.6588 | 4.14 | 5.6 | 39 | 55 | 23.2 |
| | 2500 | 0.1442 | 0.8235 | 3.97 | 7.7 | 51 | 75 | 30.4 |
| Nonwoven #4: | 0 | 0 | 0 | | | | | |
| 13 gsm Nuvisoft; | 500 | 0.0275 | 0.1573 | 5.06 | 0.4 | 4 | 4 | 2.2 |

-continued

| | | | | | | | | |
|---|---|---|---|---|---|---|---|---|
| 178 mm width | 1000 | 0.0551 | 0.3146 | 4.04 | 1.1 | 8 | 10 | 4.5 |
| | 1500 | 0.0826 | 0.4719 | 6.22 | 1.4 | 16 | 13 | 9.0 |
| | 2000 | 0.1102 | 0.6292 | 11.80 | 2 | 42 | 18 | 23.6 |
| | 2500 | 0.1377 | 0.7865 | 10.55 | 2.3 | 48 | 23 | 27.0 |
| Nonwoven #5: | 0 | 0 | 0 | | | | | |
| 18 gsm TAB SB; | 500 | 0.0193 | 0.1102 | 0.00 | 0.0 | 1 | 0 | 0.6 |
| 254 mm width | 1000 | 0.0386 | 0.2205 | 6.34 | 0.2 | 4 | 2 | 2.2 |
| | 1500 | 0.0579 | 0.3307 | 6.34 | 0.4 | 8 | 4 | 4.5 |
| | 2000 | 0.0772 | 0.4409 | 7.40 | 0.7 | 14 | 6 | 7.9 |
| | 2500 | 0.0965 | 0.5512 | 7.61 | 1.1 | 24 | 10 | 13.5 |
| Nonwoven #6: | 0 | 0 | 0 | | | | | |
| 20 gsm High-Loft | 500 | 0.0175 | 0.1000 | 0.00 | 0.7 | 0 | 5 | 0 |
| (Round + Scrim); | 1000 | 0.0350 | 0.2000 | 0.49 | 0.7 | 1 | 5 | 0.4 |
| 280 mm width | 1500 | 0.0525 | 0.3000 | 0.82 | 0.9 | 2 | 6 | 0.7 |
| | 2000 | 0.0700 | 0.4000 | 1.54 | 1.2 | 5 | 8 | 1.8 |
| | 2500 | 0.0876 | 0.5000 | 1.33 | 1.9 | 7 | 13 | 2.5 |
| | 3000 | 0.1051 | 0.6000 | 1.51 | 2.6 | 11 | 18 | 3.9 |
| | 3500 | 0.1226 | 0.7000 | 1.54 | 3.5 | 15 | 24 | 5.4 |
| Nonwoven #7: | 0 | 0 | 0 | | | | | |
| 20 gsm High-Loft | 500 | 0.0173 | 0.986 | 0.41 | 0.9 | 1 | 6 | 0.4 |
| (Ribbon + Scrim); | 1000 | 0.0345 | 0.1972 | 0.35 | 1.0 | 1 | 7 | 0.4 |
| 284 mm width | 1500 | 0.0518 | 0.2958 | 0.91 | 1.2 | 3 | 8 | 1.1 |
| | 2000 | 0.0691 | 0.3943 | 1.11 | 1.6 | 5 | 11 | 1.8 |
| | 2500 | 0.0863 | 0.4929 | 1.22 | 2.0 | 7 | 14 | 2.5 |
| | 3000 | 0.1036 | 0.5915 | 1.41 | 2.8 | 11 | 19 | 3.9 |
| | 3500 | 0.1209 | 0.6901 | 1.46 | 3.7 | 15 | 25 | 5.3 |
| Nonwoven #8: | 0 | 0 | 0 | | | | | |
| 20 gsm | 500 | 0.0172 | 0.0982 | 1.53 | 3.4 | 15 | 23 | 5.3 |
| Gen 3 High-Loft; | 1000 | 0.0344 | 0.1965 | 2.12 | 7.5 | 45 | 50 | 15.8 |
| 274 mm width | 1500 | 0.0516 | 0.2947 | 2.25 | 10.4 | 67 | 70 | 23.5 |
| | 2000 | 0.0688 | 0.3930 | 2.25 | 13.9 | 89 | 93 | 31.2 |
| | 2500 | 0.0860 | 0.4912 | 2.00 | 17.9 | 102 | 120 | 35.8 |
| | 3000 | 0.1032 | 0.5894 | 1.94 | 20.7 | 115 | 139 | 40.4 |
| Nonwoven #9: | 0 | 0 | 0 | | | | | |
| 20 gsm | 500 | 0.0178 | 0.1018 | 2.06 | 3.5 | 20 | 22 | 7.3 |
| High-Loft (no scrim); | 1000 | 0.0357 | 0.2036 | 2.69 | 5.9 | 44 | 37 | 16.0 |
| 274 mm width | 1500 | 0.0535 | 0.3054 | 2.52 | 10.0 | 69 | 62 | 25.1 |
| | 2000 | 0.0713 | 0.4073 | 2.22 | 14.8 | 90 | 92 | 32.7 |
| | 2500 | 0.0892 | 0.5091 | 2.09 | 18.8 | 108 | 114 | 39.3 |
| | 3000 | 0.1070 | 0.6109 | 1.88 | 22.8 | 118 | 142 | 42.9 |
| Nonwoven #10: | 0 | 0 | 0 | | | | | |
| 20 gsm | 500 | 0.0179 | 0.1022 | 1.07 | 8.2 | 24 | 67 | 8.8 |
| Ribbon (no scrim); | 1000 | 0.0358 | 0.2044 | 1.34 | 12.8 | 47 | 105 | 17.2 |
| 274 mm width | 1500 | 0.0537 | 0.3066 | 1.33 | 19.5 | 71 | 160 | 25.9 |
| | 2000 | 0.0716 | 0.4087 | 1.07 | 26.8 | 79 | 220 | 28.8 |
| | 2500 | 0.0895 | 0.5109 | 1.11 | 24.1 | 104 | 280 | 38.0 |
| | 3000 | 0.1074 | 0.6131 | 1.05 | 42.1 | 118 | 345 | 43.1 |

These and other modifications and variations to the invention may be practiced by those of ordinary skill in the art without departing from the spirit and scope of the invention, which is more particularly set forth in the appended claims. In addition, it should be understood that aspects of the various embodiments may be interchanged in whole or in part. Furthermore, those of ordinary skill in the art will appreciate that the foregoing description is by way of example only, and it is not intended to limit the invention as further described in such appended claims. Therefore, the spirit and scope of the appended claims should not be limited to the exemplary description of the versions contained herein.

That which is claimed:

1. A nonwoven fabric, comprising:

(i) a first disposable-high-loft ("DHL") nonwoven layer consisting of a first plurality of crimped multi-component spunbond fibers of continuous length and being consolidated by a plurality of discrete first thermal bond sites having a first average bond site area; wherein the first DHL nonwoven layer has a first density and a first bonded area comprising from 7% to 15%, and the first bonded area is defined by the plurality of discrete first thermal bond sites, and wherein the first DHL nonwoven layer has a thickness from 0.2 to 2.75 mm; and (ii) a scrim comprising one or more spunbond layers including a plurality of monocomponent spunbond fibers of continuous length, wherein the scrim is consolidated by a plurality of discrete scrim thermal bond sites having a second average bond site area, wherein the scrim comprises a first side, a second side, and a scrim density; wherein the first side of the scrim is bonded directly to the first DHL nonwoven layer and the scrim density is larger than the first density;

wherein (a) an average distance between adjacent scrim thermal bond sites is smaller than an average distance between adjacent first thermal bond sites, wherein the average distance between adjacent scrim thermal bond sites is from 0.1 mm to 10 mm, (b) the second average bond site area is larger than the first average bond site area, and (c) at least a portion of the plurality of discrete first thermal bond sites extends entirely through the first DHL nonwoven layer and thermally bonds the first DHL nonwoven layer to the scrim.

2. The nonwoven fabric of claim 1, wherein the first plurality of crimped multi-component fibers comprise bi-component spunbond fibers.

3. The nonwoven fabric of claim 1, wherein the first plurality of crimped multi-component fibers comprise an average free crimp percentage from about 50% to about 300%.

4. The nonwoven fabric of claim 1, wherein the first plurality of crimped multi-component fibers include a plurality of discrete zig-zag configured crimped portions, a plurality of discrete helically configured crimped portions, or a combination thereof.

5. The nonwoven fabric of claim 1, wherein the plurality of discrete first thermal bond sites has an average distance between adjacent first thermal bond sites from about 1 mm to about 10 mm and wherein the first plurality of crimped multi-component fibers comprise one or more crimped portions located between adjacent first thermal bond sites.

6. The nonwoven fabric of claim 1, wherein the first DHL nonwoven layer comprises a first basis weight from about 5 to about 25 gsm and a first density comprising from about 60 $kg/m^3$ or less.

7. The nonwoven fabric of claim 1, wherein the first plurality of crimped multi-component fibers comprise a round cross-section, a non-round cross-section, or a combination thereof.

8. The nonwoven fabric of claim 1, wherein the first plurality of crimped multi-component fibers comprise an eccentric sheath/core configuration, a side-by-side configuration, a pie configuration, an islands-in-the-sea configuration, a multi-lobed configuration, or any combination thereof.

9. The nonwoven fabric of claim 8, wherein the eccentric sheath/core configuration includes a sheath component and core component; wherein the core component defines at least a portion of an outer surface of the crimped multi-component fiber having the eccentric sheath/core configuration.

10. The nonwoven fabric of claim 1, wherein the first plurality of crimped multi-component fibers comprises a first component comprising a first polymeric composition and a second component comprising a second polymeric composition; wherein the first polymeric composition is different than the second polymeric composition.

11. The nonwoven fabric of claim 1, further comprising a second DHL nonwoven layer comprising a second plurality of crimped multi-component fibers; wherein the second DHL nonwoven layer is bonded directly or indirectly to the second side of the scrim and the second DHL nonwoven layer has a second density, wherein the scrim density is larger than the second density.

12. The nonwoven fabric of claim 1, wherein the scrim consists of the one or more spunbond layers.

13. The nonwoven fabric of claim 1, wherein the scrim comprises a scrim bonded area comprising about 15% or more, and the scrim bonded area is defined by the plurality of discrete scrim thermal bond sites, wherein the average distance between adjacent first thermal bond sites is from about 1.5 times to 10 times greater than the average distance between adjacent scrim thermal bond sites.

14. The nonwoven fabric of claim 13, wherein the average distance between adjacent first thermal bond sites is from about 3 times to 10 times greater than the average distance between adjacent scrim thermal bond sites.

15. The nonwoven fabric of claim 14, wherein the scrim is devoid of crimped fibers.

16. The nonwoven fabric of claim 1, wherein the scrim comprises a scrim basis weight from about 4 to about 30 gsm and the scrim density comprises from about 80 to about 150 $kg/m^3$; and wherein a density ratio between the scrim density and the first density comprises from about 15:1 to about 1.3:1; and wherein a bond area ratio between a scrim bond area and a first bond area of the first DHL nonwoven layer comprises from about 4:1 to about 10:1.

17. The nonwoven fabric of claim 1, further comprising a percent elongation ratio in a machine direction at 5 N/5cm between the first DHL nonwoven layer and the scrim comprises from about 1.5:1 to about 20:1, a percent width reduction in a cross-direction at 0.1 N/mm between the first DHL layer and the scrim comprises from about 1.25:1 to about 5:1, or both.

18. The nonwoven fabric of claim 1, wherein the first bonded area comprises from 10% to 15%.

19. The nonwoven fabric of claim 1, wherein the scrim consists of the plurality of monocomponent spunbond fibers of continuous length.

20. The nonwoven fabric of claim 1, wherein the first DHL nonwoven layer has a thickness from 0.2 to 2.5 mm, and wherein the average distance between adjacent scrim thermal bond sites is from 0.1 mm to 3 mm.

21. The nonwoven fabric of claim 1, wherein the first DHL nonwoven layer has a thickness from 0.2 to 2 mm.

22. A method of forming a nonwoven fabric, comprising:

(i) forming a first DHL nonwoven layer comprising depositing continuous attenuated filaments from a fiber draw unit and forming a first plurality of crimped multi-component spunbond fibers of continuous length upon removal of an attenuating force from the fiber draw unit followed by consolidation forming a plurality of discrete first thermal bond sites having a first average bond site area; wherein the first DHL nonwoven layer has a first density and a first bonded area comprising from 7% to 15%, and the first bonded area is defined by the plurality of discrete first thermal bond sites, and wherein the first DHL nonwoven layer has a thickness from 0.2 to 2.75 mm;

(ii) forming or providing a scrim comprising one or more spunbond layers including a plurality of monocomponent spunbond fibers of continuous length, wherein the scrim is consolidated by a plurality of discrete scrim thermal bond sites having a second average bond site area, wherein the scrim comprises a first side and a second side; wherein the scrim has a scrim density that is larger than the first density; and (iii) directly bonding the first side of the scrim to the first DHL nonwoven layer to provide the nonwoven fabric;

wherein (a) an average distance between adjacent scrim thermal bond sites is smaller than an average distance between adjacent first thermal bond sites, wherein the average distance between adjacent scrim thermal bond sites is from 0.1 mm to 10 mm, and (b) the second average bond site area is larger than the first average bond site area.

* * * * *